United States Patent [19]
Schuyler

[11] Patent Number: 5,832,526
[45] Date of Patent: Nov. 3, 1998

[54] METHOD AND APPARATUS USING SLACK AREA OF FILE STORAGE STRUCTURES FOR FILE RECONSTRUCTION

[75] Inventor: David E. Schuyler, Duarte, Calif.

[73] Assignee: Symantec Corporation, Cupertino, Calif.

[21] Appl. No.: 592,873

[22] Filed: Jan. 24, 1996

[51] Int. Cl.[6] .................................................. G06F 17/30
[52] U.S. Cl. .......................... 707/205; 707/200; 707/202; 707/206; 711/173; 395/182.03
[58] Field of Search ..................... 395/621, 622, 395/611, 618, 182.03, 182.01; 707/205, 206, 200, 202; 711/173, 170, 171

[56] References Cited

U.S. PATENT DOCUMENTS

| | | | |
|---|---|---|---|
| 5,313,626 | 5/1994 | Jones et al. | 395/182.03 |
| 5,321,824 | 6/1994 | Burke et al. | 711/220 |
| 5,347,651 | 9/1994 | Burke et al. | 707/205 |
| 5,398,142 | 3/1995 | Davy | 360/48 |
| 5,432,928 | 7/1995 | Shermon | 707/3 |
| 5,473,753 | 12/1995 | Wells et al. | 395/182.03 |
| 5,555,405 | 9/1996 | Griesmer et al. | 707/205 |
| 5,561,786 | 10/1996 | Morse | 711/170 |

*Primary Examiner*—Thomas G. Black
*Assistant Examiner*—Greta L. Robinson
*Attorney, Agent, or Firm*—Fliesler, Dubb, Meyer & Lovejoy

[57] ABSTRACT

Available slack area in file storage structures is used for storing file-reconstruction data. The file-reconstruction data includes a unique end-of-file tag code (405) positioned within a vital core (403) section of limited length. The vital core section is located close to or against the end of the slack area. Less-essential file-reconstruction data is grown frontwards from the vital core section to the beginning of the slack area as room permits. During file recovery, the random access storage device (e.g., a disk whose directory structure has been damaged) is scanned for storage sub-areas (e.g., allocation blocks) containing the predefined, unique end-of-file tag code appropriately positioned within the vital core portion at the end of the sub-area. Each storage sub-area having such a properly-positioned end-of-file tag code is designated as a possible end-of-file sub-area. A file recovery program uses this and other available information to reconstruct the directory structure to whatever extent is made possible.

43 Claims, 11 Drawing Sheets

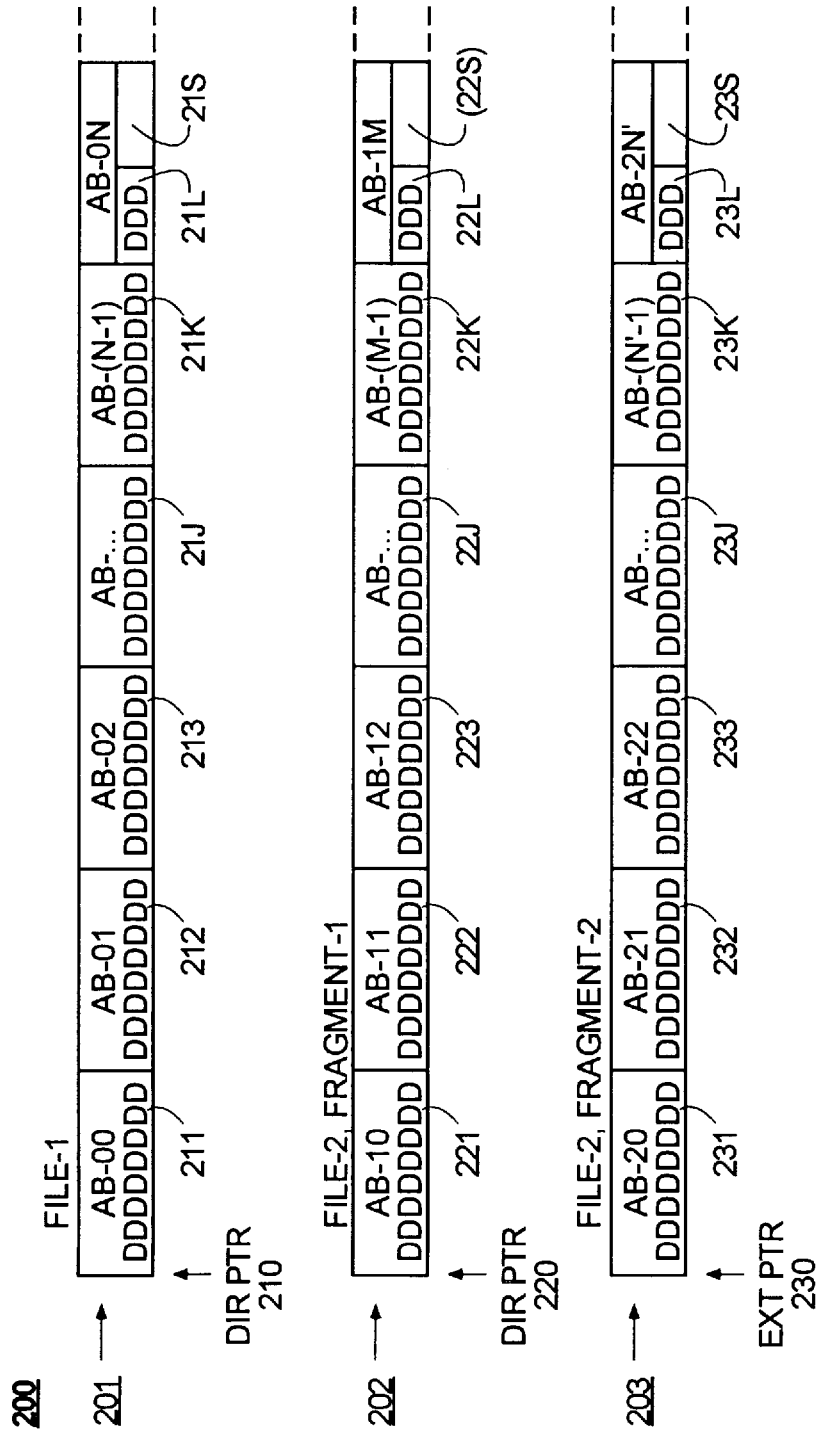

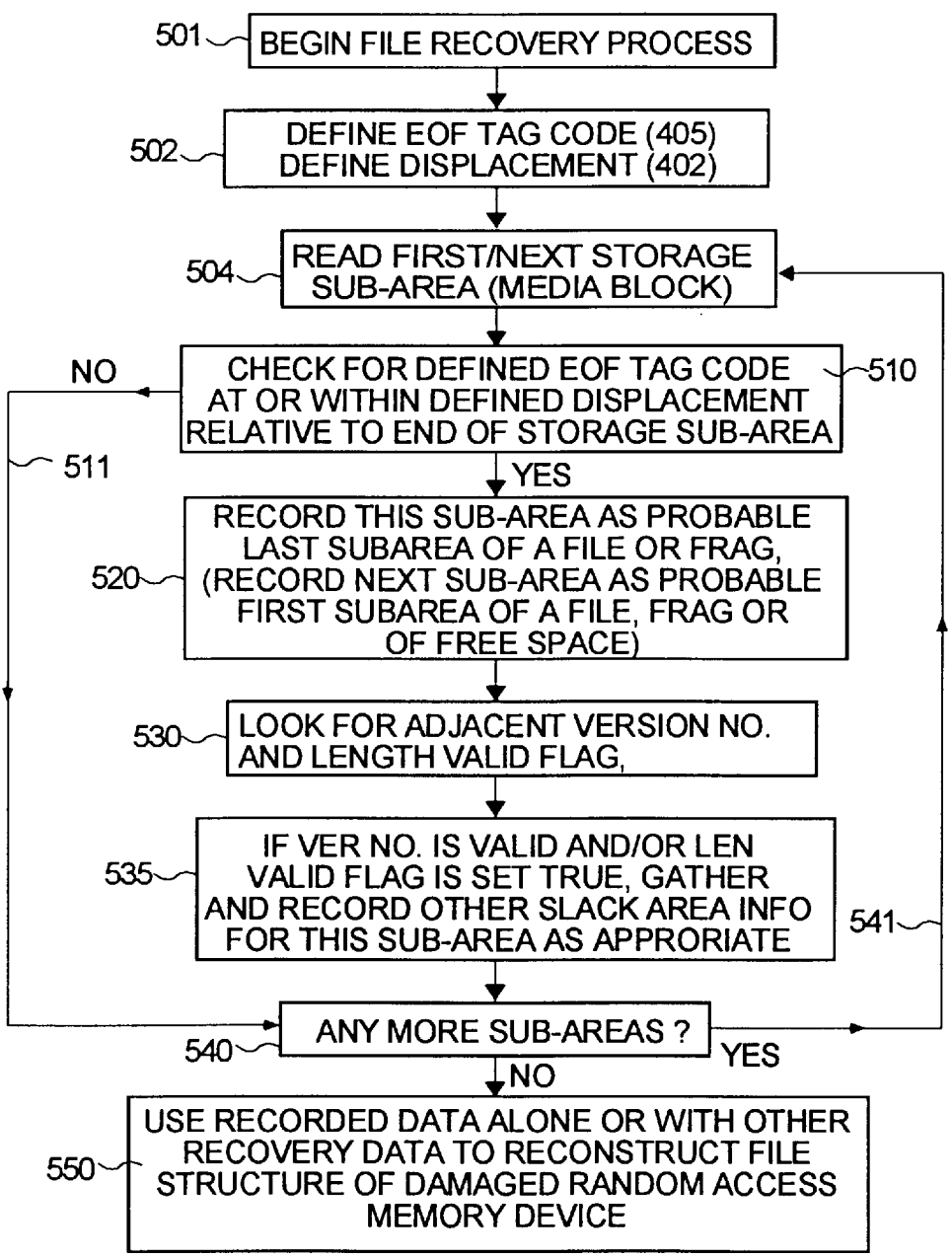

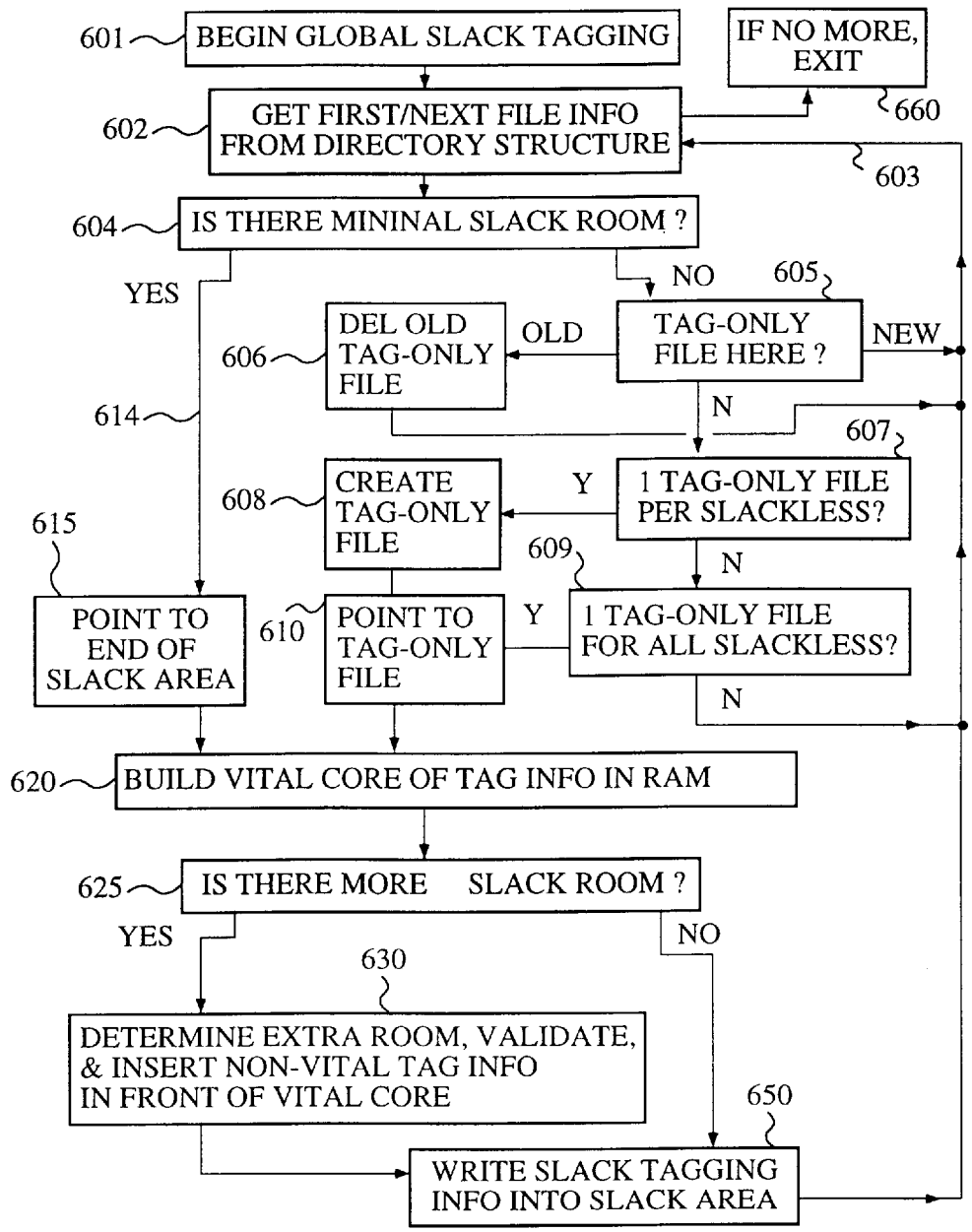

METHOD AND APPARATUS USING SLACK AREA OF FILE STORAGE STRUCTURES FOR FILE RECONSTRUCTION

BACKGROUND

1. Field of the Invention

The invention relates generally to the storage of digital data files on random access storage devices such as magnetic disk, writable-optical disk, and the like.

The invention relates more specifically to methods for reconstructing data files stored on a random access storage device (RASD) in the event there is loss or corruption of file structure data. Such file structure data identifies storage areas of the RASD that are used for forming each respective data file.

2. Cross Reference to Related Applications

The following copending U.S. patent application(s) is/are assigned to the assignee of the present application, is/are related to the present application and its/their disclosures is/are incorporated herein by reference:

(A) Ser. No. 08/518,191 filed Aug. 23, 1995 by Leo Cohen and entitled, SUBCLASSING SYSTEM FOR COMPUTER THAT OPERATES WITH PORTABLE-EXECUTABLE (PE) MODULES.

3. Description of the Related Art

Data storage space in random access storage devices (RASD's) such as magnetic disk, optical disk, flash EEPROM and the like, is typically subdivided into discrete storage sub-areas. Each such sub-area has a respective, predefined storage capacity that is smaller than the overall data storage capacity of the RASD.

The storage sub-areas of a magnetic disk or other RASD are referred to in the industry by many different names including: 'clusters', 'allocation blocks', and 'sectors'. Typically, a cluster or an allocation block will contain a predefined plurality of sectors.

Data files are usually recorded on RASD's by using specific ones of the storage sub-areas as elementary construction blocks. The operating system software generally does not allow a file to be anything other than an integral number of storage sub-areas.

The data of a pre-recorded data file is accessed by identifying the storage sub-areas that have been assigned to that data file and reading from, or writing to, the identified storage sub-areas as appropriate.

Quite often, the logical sequence or other logical organization of the elemental storage sub-areas of a given file plays as important a role in defining the given data file as do the specific identities of the storage sub-areas that contain the file's data. For example, if the file is a letter to a friend and the letter has three parts: a heading portion stored in a first storage sub-area; a body portion stored in a second storage sub-area; and a closing portion stored in a third storage sub-area, then proper recreation of the letter generally calls for an accessing of the respective first through third storage sub-areas in the recited order. To do so, one generally needs to know both the identity of the first through third storage sub-areas and their logical order.

The storage sub-areas (e.g., 'allocation blocks') of a given random access storage device (RASD) may be distributed physically about the storage device in many different ways including but not limited to: (1) the sub-areas being provided on each of a series of concentric rings (such as is conventionally done on the tracks of magnetic disks), and (2) the storage sub-areas being provided sequentially along a spirally wound path (such as is conventionally done on compact optical disks (CD or CD-ROM platters)).

In accessing a specified portion of a file for purposes of reading data from and/or writing data to that file portion, it is often necessary to identify the specific physical location of the one or more corresponding storage sub-areas either directly or indirectly. Signals representing the identified physical locations are generated and then provided to a locating means such as the read/write head actuator of a magnetic disk drive. (If the RASD is an EEPROM or a magnetic bubble memory, the storage sub-area identifying signals can be simply address signals that point to the start of a desired sub-area.)

Normally, a pre-specified portion of the random access storage device is set aside for storing data structure information. This data structure information identifies the specific sub-areas that form each data file. It also indicates the logical sequence or other logical organization of those file-forming sub-areas. The set-aside portion of the RASD is often referred to as the 'directory structure' area.

The directory structure area may store one or more data structures of its own that are generally referred to in the industry as: a volume catalog, a catalog extension structure, and a file allocation table (FAT). Different names and slightly different functions may be assigned to each of the file-defining data-structures in the directory structure area depending on the one or more specific 'file structures' that are used by a given random access storage device and its corresponding, software-defined disk-operating system (DOS).

For purpose of example, assume that the RASD in question is a magnetic hard disk (a Winchester-type disk) and that the disk has fixed-size sectors organized as concentric rings distributed between its inner and outer operative diameters. Such rings are typically referred to as 'tracks'.

The exemplary magnetic disk typically includes a file allocation table (FAT) that identifies which of the allocation blocks are free from defect (which are 'good') such that they may be safely used for data storage. The FAT will typically also indicate which of the defect-free 'good' allocation blocks are presently free or available for storing newly-introduced data. Allocation blocks that store data of an existing file are designated as not-free.

Each free allocation block that is allocated for storing newly-introduced data is logically removed from a 'free list' and is used for storing a next quantum of newly-introduced data not exceeding the maximum storage capacity of that allocation block.

Because each allocation block can store a maximum amount of data such as 1024 bytes (1K) or 2048 bytes (2K) per allocation block, when a file is created for storing more than one-allocation block's worth of data, the file's data is subdivided and distributed across a plurality of allocation blocks.

A volume catalog is established on the disk for associating a 'file_name' with the stored data of the file. The volume catalog is also used for storing 'file_start' data such as track and sector numbers that point to the physical location on the RASD at which the file starts. The volume catalog also usually stores 'file_size' data for indicating the size of the file in terms of the number of bytes that the particular file contains or 'file_end' data for indicating where the end point of the file's data is through other appropriate means.

For most files, not all the available storage space of the allocated sectors (or other allocated storage sub-areas) is used. There is usually some slack space.

When a disk (or other RASD) is relatively new, either at the start of the disk's operating life, or just after it has been re-formatted, the disk has many sections of logically-contiguous and 'free' sectors available for receiving and contiguously storing the data of large files. The resulting file structures for an initial set of recordings tend to be logically contiguous or whole.

However, as the disk begins to fill up, and as old files are deleted and newer files are added, and/or as pre-existing files are modified many times over, the stored files on the disk tend to become 'fragmented'.

The term, 'fragmented' is used herein to describe the condition in which the data of a specific file is no longer entirely stored along a logically sequential series of discrete storage sub-areas (e.g., allocation blocks). Rather, the data of a fragmented file is scattered about the random access storage device in a more random, spaced apart fashion.

When a file is fragmented, it may be necessary to perform multiple seeks between widely spaced-apart sections of the disk (e.g., jumps between nonadjacent tracks) in order to access the file for reading and/or writing. This may disadvantageously increase file access time. Accordingly, file fragmentation is generally undesirable.

When file fragmentation begins to occur, additional information is usually added to the directory structure of the disk to indicate where the various fragments of each file are located. This additional information is often stored in a structure referred to as the 'volume catalog extension'. The volume catalog extension or its equivalent is used to logically tie together the fragmented portions of each file. The volume catalog extension structure is sometimes alternatively referred to as the 'extents tree'. Fragments that logically follow a given first fragment of a file are sometimes correspondingly referred to as the 'extents' of that first fragment.

In some systems such as Apple Macintosh (the latter is a trademark of Apple Computer of Cupertino, Calif.), a same pathname/filename may simultaneously reference a plurality of logically parallel 'forks' such as a 'data fork' and a 'resource fork'. The 'data fork' contains what is routinely considered by users to be the file's data while the 'resource fork' contains system-related information that is used by the operating system to process the contents of the 'data fork'. By way of example, a 'resource fork' may contain instructions on what fonts should be applied to various text segments within the 'data fork' or what display 'window preferences' should be used for the named file. The 'resource fork' may also contain definitions for 'dialogue' or 'alert' boxes that are sometimes flashed on the screen during usage of the given file. When a named file is deleted, all of its forks are deleted. When a new file is created, all of its forks are simultaneously created.

Each time a previously-stored file is to be retrieved in whole or in part from the random access storage device, the disk-operating system typically first consults the corresponding volume catalog to determine if the data of the named file physically resides on the storage device and if so, where it resides. If the file is fragmented, the extents tree may also have to be consulted to locate the various fragments of the file.

A variety of events may occur during the operational life of a disk that work to undesirably damage different parts of the disk and/or destroy data that is stored in those parts. One of these damaging events may destroy the file-structure information stored in the directory structure area of the disk. In such a case, it may no longer be possible to use the directory structure for performing one or more of its associated functions, namely: (1) identifying the physical start (file_start) of each stored file; (2) associating each file with a corresponding file_name; (3) indicating the sequence of allocation blocks or fragments that store the file's data; and/or (4) identifying the end of file (EOF) point within the last logical allocation block of the file.

There are other, less-critical functions that the directory structure may perform and which may also be adversely impacted by directory structure corruption. The list of these other functions can be quite long and can vary from one computer system to another, but generally tends to include: (5) specifying the last revision date and time for the file; (6) specifying a date and time for the initial creation of the file; (7) specifying a person or other entity responsible for the initial creation of the file; (8) specifying read, write and execution permissions for various users and user groups; and (9) specifying search keywords that enable quick finding of the file and/or quick cross correlation of the present file with other files; (10) specifying the last tape or other backup date and time for the file; (11) specifying a graphical icon and its position in a graphical user interface (GUI) where the graphical icon represents the file; (12) specifying a unique file number for the file, which number may be used as an 'aka' alternate ('also known as') for identifying the file without using the file's file_name; (13) specifying a generic file type for the file (e.g., text, executable, graphic), which file type may be used for generically categorizing the file's data; (14) specifying an application program to be associated with the file, such as the application program that created or last modified the file; (15) identifying the directory or folder in which the file is most immediately contained; (16) specifying the hierarchy of directories or folders in which the file is contained; and (17) recording user comments about the file.

When the directory structure is destroyed or otherwise damaged, it may not be possible to easily locate the different parts of each data file on the corresponding RASD.

A variety of 'file recovery' techniques have been developed for recovering some or all of each file's data in the event of damage to the directory structure.

One such file recovery technique relies on 'directory mirroring'. The entire directory structure is periodically copied to a secondary location on the disk. If the primary directory structure is damaged, the mirror directory structure is instead used to access the corresponding files.

Disk mirroring is disadvantageous in that it consumes storage space that could be otherwise used for storing file data. Disk mirroring is additionally disadvantageous in that time and resources are wasted in routinely making secondary modifications to the mirror directory structure each time primary modifications are made to the primary directory structure.

A second file recovery technique that has been used is known as 'masked searching'. Masked searching tries to take advantage of the fact that various application programs (e.g., word processors, spreadsheets and databases) place unique header blocks at the beginnings of their respectively-generated data files or conform with unique templates for arranging data within respectively-generated data files. The masked searching technique scans the disk for these unique header blocks (or unique templates) and thereby identifies the probable locations where each such application-generated file begins.

Masked searching has the disadvantage that not all file-generating programs produce unique header blocks for their corresponding data files. Also, as the number of application programs and respective revisions grows, the masked searching algorithm must be continuously updated to account for the file header templates of the new and revised applications.

SUMMARY OF THE INVENTION

In accordance with the invention, the above-mentioned problems are overcome by providing a novel alternative or supplemental system for file recovery that does not consume substantial amounts of extra storage space.

To the extent that room is available, unique end-of-file tagging code and other file reconstruction information is placed in the storage slack area of at least the logically-last storage sub-area of each file or file fragment of a given random access storage device.

This slack area information may be recorded and updated at various times such as when the file is first created, and/or each time the file is changed and/or after each defragmentation of files on the random access storage device.

The end-of-file tagging code is preferably positioned within the slack area at or substantially near to the very end of the logically-last storage sub-area of the file or of the file fragment.

Other, less-essential, slack area information may be optionally appended in a frontwards-growing direction as room permits within the slack area, in accordance with the level of importance that the less essential information has to file recovery operations.

If loss or corruption of the directory structure occurs, the random access storage device (RASD) is scanned for sub-areas (e.g., disk allocation blocks) containing the unique end-of-file tagging code (which code is preferably positioned at or near the very end of each such tag-code-containing sub-area). Storage sub-areas that are found to include the unique end-of-file tagging code positioned at or near the very end of the storage sub-area are designated as locations where a respective file or file fragment probably ends. Thus the demarcation between some if not all files is reestablished.

The other, less essential slack-area information, if present, may be used during file recovery to reestablish the size of the file, the number of fragments used by the file, and other attributes that are useful for file recovery and reuse.

A random access storage device in accordance with the invention comprises: (a) a plurality of files recorded across respective pre-allocated storage sub-areas of the RASD, and (b) file tagging information recorded in available slack portions of the allocated storage sub-areas of each file.

A tagging method in accordance with the invention comprises the steps of: (a) locating the logically-last storage sub-area of each file or file fragment whose data is stored across pre-allocated storage sub-areas of a random access storage device; (b) determining if and how much storage slack space is available in each such logically-last storage sub-area; (c) in accordance with the available slack area, recording an end-of-file tagging code in the slack area, if any, and further recording other attribute information as the available slack space further allows.

A data recovery method in accordance with the invention may be applied to a random access storage device (RASD) with a damaged directory structure, where the RASD contains files defined by storage sub-areas and at least some of the sub-areas contain slack areas tagged by a predefined unique tagging code, where the recovery method comprises the steps of: (a) scanning the random access storage device to identify each storage sub-area containing the unique tagging code; (b) in response to the identification of such storage sub-areas, forming and storing file recovery information that indicates the locations of the identified storage sub-areas as respective, possible end positions and/or beginning positions for corresponding files or file fragments; and (c) reconstructing a directory structure in accordance with the formed file recovery information.

A data-recovery assisting apparatus in accordance with the invention is provided for operatively coupling to the system processing unit (CPU) of a computer system having a random access storage device (RASD) with a damaged directory structure, where the RASD contains files defined by storage sub-areas and at least some of the sub-areas contain slack areas tagged by a predefined unique tagging code, and where the data-recovery assisting apparatus contains instructions for causing the system processing unit to carry out a recovery process including the steps of: (a) scanning the random access storage device to identify each storage sub-area containing the unique tagging code; (b) in response to the identification of such storage sub-areas, forming and storing file recovery information that indicates the locations of the identified storage sub-areas as respective, possible end positions and/or beginning positions for corresponding files or file fragments; and (c) reconstructing a directory structure in accordance with the formed file recovery information.

Other aspects of the invention will become clear from the below detailed description.

BRIEF DESCRIPTION OF THE DRAWINGS

The below detailed description makes reference to the accompanying drawings, in which:

FIG. 2 illustrates the data structure of conventional files;

FIG. 5 is a flow chart of a file recovery method in accordance with the invention;

FIG. 6 is a flow chart of a first slack area tagging method in accordance with the invention.

DETAILED DESCRIPTION

Figure 1A:
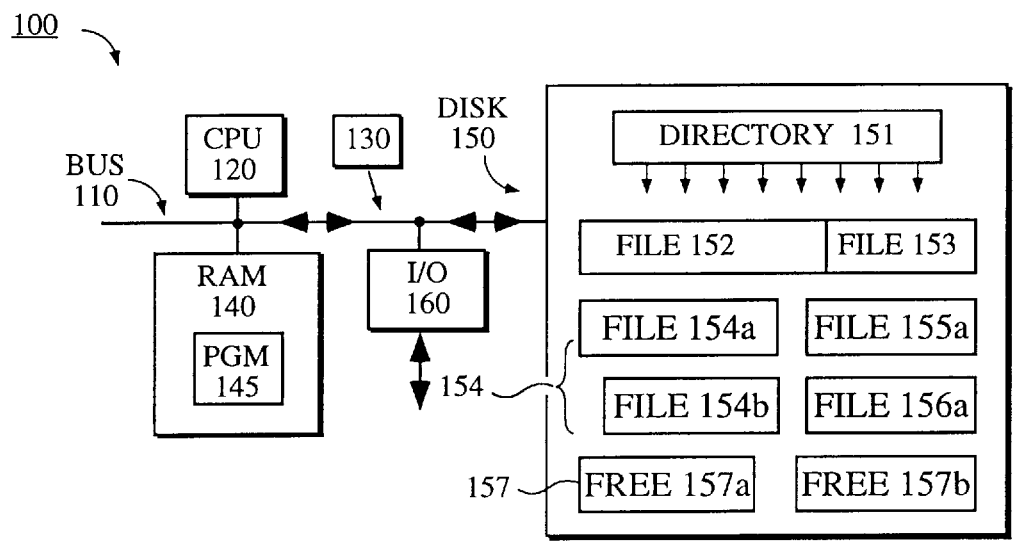
FIG. 1A is a block diagram of a computer system in which the slack-tagging method of the invention may be used.

FIG. 1A diagrams a computer system 100 that may be used in accordance with the invention. Computer system 100 includes a system bus 110 coupling a system memory 140 such as a random access memory (RAM) to a plurality of other system resources including a system CPU 120, a nonvolatile disk subsystem 150, and system I/O 160.

The system memory 140 may comprise an assorted type of high-speed random access devices into which immediately executable code may be stored. System memory 140 can include one or more of static random access memory (SRAM), dynamic random access memory (DRAM), and other like devices. Typically at least part of the system memory 140 is volatile, meaning data is lost and must be rewritten when power is lost, although it is not outside the contemplation of the invention to have system memory 140 defined by non-volatile random access memory devices such as flash EEPROM.

Often the computer system 100 will include a small boot ROM (read-only memory, not shown) coupled to the CPU 120 for power-up and other re-bootings of the system.

When system 100 boots-up, an attempt is made to automatically load various files from the disk subsystem 150 or from elsewhere (e.g., from system I/O 160) into system memory 140 to thereby create executable code and other useful data structures within system memory 140. The illustrated program, PGM 145 is an example. The executable code and/or other data structures 145 normally include system-executable instruction code that can be immediately executed by a responsive data processing unit such as the illustrated central processing unit (CPU) 120 of FIG. 1A or by non-centralized multiple data processing units (not shown) that may be further or alternatively coupled to bus 110.

The system I/O module 160 uses bus 110 for transferring data between one or more of the illustrated portions of system 100 and external devices. In one embodiment, the system I/O module 160 may couple the illustrated system 100 to a local area network (LAN) or to a wide area network (WAN) or to other external data transceiving and processing means (e.g., a cable headend or a space satellite system).

The disk subsystem 150 may include a mechanical or other type of drive (not separately shown) and a data storage medium (not separately shown) into which data may be stored and from which data may be retrieved. The disk data storage medium may be in the form of a magnetic hard disk, or a floppy diskette, or a rewritable optical disk, or other such non-volatile, randomly accessible, readable and writable media. ROM or Flash EEPROM may be alternatively used in carrying out some or all of the nonvolatile data storing functions of the disk subsystem 150.

Data is recorded on the disk subsystem 150 to define a directory structure 151 and a plurality of files (not all shown). Down-pointing arrow-headed lines are drawn emanating from the bottom of area 151 to indicate that directory structure 151 points the way to the start and subsequent portions of the RASD-internal files.

A first such file 152 is shown to have all of its data recorded in logically sequential order across logically successive storage sub-areas of a corresponding first storage area that is also designated as 152. (The specific sub-areas are not shown.)

A second file 153 is similarly shown to have all of its data recorded in logically sequential order across logically successive storage sub-areas of a corresponding second storage area that is also designated as 153. The second storage area 153 is immediately adjacent to the first storage area 152. Each of the first and second files, 151 and 153, is not fragmented.

A fragmented, third file 154 is illustrated as having part of its data recorded in successive storage sub-areas of a third storage area that is designated as 154a and another part of its data recorded in successive storage sub-areas of a fourth storage area that is designated as 154b. The third and fourth storage areas, 154a and 154b, are not immediately adjacent to one another.

By way of further example, fragmented portions 155a and 156a of respective fourth and fifth files, 155 and 156, are shown to be physically positioned near the third and fourth storage areas, 154a and 154b.

Physical discontinuity is not a pre-requisite for considering a file to be fragmented. It is merely used in FIG. 1A as a convenient illustrative gimmick for indicating the fragmented condition. If second storage area 153 had been alternatively defined as storing a beginning half of a hypothetical file number 1532 (not shown) and first storage area 152 had been alternatively defined as storing the ending half of the same hypothetical file number 1532, then hypothetical file number 1532 might be considered to be fragmented because a jump between nonadjacent storage areas (e.g., nonadjacent tracks) is needed to span from the end of second storage area 153 to the beginning of first storage area 152.

The data recorded within the disk subsystem 150 may be brought into subsystem 150 through a variety of data conveying means 130 including but not limited to: floppy diskettes, compact-disks (CD ROM), tape, and over-a-network downloading from a file server computer (not shown) or the like.

Each time new files are added, sub-areas (e.g., allocation blocks) in a free space 157 are re-allocated for storing the newly-added data and the directory structure 151 is modified accordingly.

Each time old files are deleted, the corresponding sub-areas are re-allocated back to the free space 157 and the directory structure 151 is modified accordingly. The free space 157 may be fragmented as indicated by the separation between its respective free space storage areas 157a and 157b or it may be constituted by one contiguous storage area.

Figure 1B:
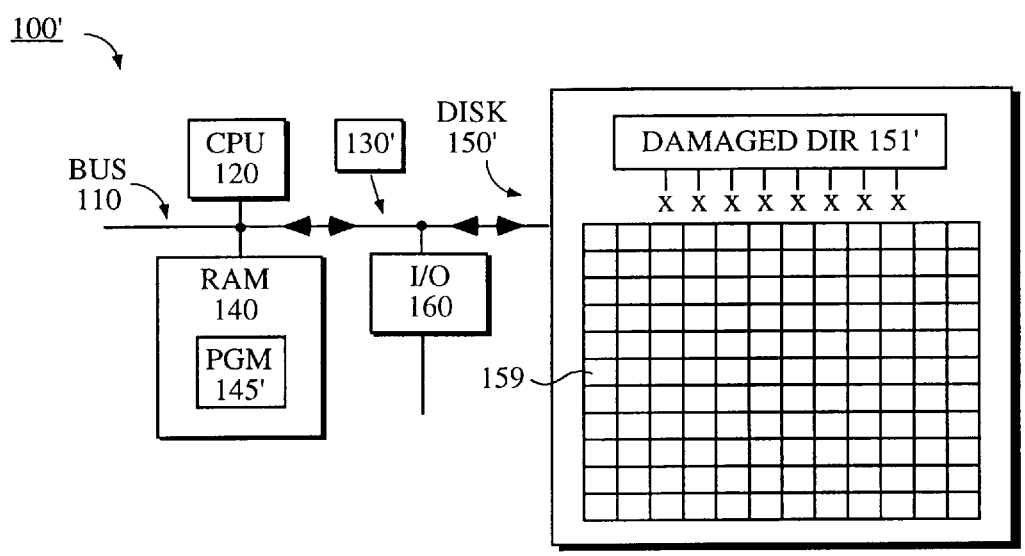
FIG. 1B is a block diagram of the same computer system under the condition where the primary directory structure has been corrupted.

Referring to FIG. 1B, if the directory structure 151 of FIG. 1A is destroyed or its file identifying functions are otherwise destructively interfered with, the data storage space of the thusly damaged disk subsystem 150' may be transformed to appear as a homogeneous mass 159 of storage sub-areas for which there is no recorded information that allows one to determine which sub-area belongs to what file and how these sub-areas 159 are to be logically organized for defining each corresponding file.

The damaged directory structure is indicated as 151' in FIG. 1B. X-headed lines are drawn emanating down from the damaged directory structure 151' to indicate that the directory structure 151' no longer points the way to the start and subsequent portions of files that had been previously recorded into the now-damaged disk subsystem 150'.

As will be detailed later, a file recovery diskette or other data conveying means 130 may be used to load a file recovery program 145' into system memory 140. This loaded recovery program 145' contains instructions that are executable by the system processing unit (CPU) 120 and allow unit 120 to reconstruct at least part of the original directory structure 151 or to otherwise identify the start, end and intermediate parts of each file.

FIG. 2 shows a sample data structure 200 that may be recorded on disk subsystem 150. Data structure 200 includes a first section 201 storing the entirety of a first nonfragmented file named FILE-1. Data structure 200 further includes a second section 202 storing a first fragment, FRAGMENT-1, of a second file, FILE-2, and a third, spaced apart section 203 storing a second fragment, FRAGMENT-2, of the second file, FILE-2.

The first section 201 (FILE-1) consists of a logically contiguous succession of storage sub-areas which are referred to here as allocated blocks AB-00, AB-01, AB-02, . . . AB-(n-1) and AB-0N. (In some systems the allocated blocks may be referred to as assigned clusters or as allocated sectors.)

A first pointer 210 within the directory structure 151 points to the beginning of allocated block AB-00 as the start of data for FILE-1. The data of FILE-1 is divided into logically sequential data sections 211, 212, 213, . . . 21J, 21K and 21L and it is distributed as such across the correspondingly-sequential allocation blocks AB-00 through AB-0N. As seen, each of data sections 211, 212, 213, . . . 21J and 21K of FILE-1 contains a same amount of data DDDDDDDD that consumes the full storage capacity of its respective allocation block, AB-00 through AB-(n-1). The last data section 21L, however, contains an amount of file data DDD that consumes only a part of the storage capacity of the last allocated block AB-0N. The remainder of the last block AB-0N is left over as slack area 21S.

Although slack area 21S is shown as being blank in FIG. 2, those skilled in the art will appreciate, it is rare that slack area 21S is truly 'blank'. Some form of bit pattern will typically fill this slack area 21S. The bit pattern in slack area 21S may be a random bit pattern or it may consist of a series of bytes each representing a common value such as $00_{hex}$ or $FF_{hex}$ or $D6_{hex}$ or $A5_{hex}$. Code sequences such as $00_{hex}$ or $FF_{hex}$ are typically used to denote null spaces or invalid characters. Code sequences such as $D6_{hex}$ or $A5_{hex}$ are typically used by disk testing software to detect bad sectors.

So in general, if the slack area 21S is not filled with relatively random data, quite often, one will find the slack area 21S being filled with common byte sequences such as the $00_{hex}$ code or the $FF_{hex}$ code or the $D6_{hex}$ code or the $A5_{hex}$ code.

The boundary line that separates the last data section 21L of FILE-1 and the slack area 21S is defined either by the directory structure 151 or by some other appropriate means such as a file size header within the first few data sections 211–213 of FILE-1.

A similar arrangement is used for FRAGMENT-1 and FRAGMENT-2 of FILE-2 as indicated at areas 202 and 203. A second pointer 220 within the directory structure 151 points to the logically first allocated block AB-10 of FRAGMENT-1 of FILE-2. A third pointer 230 within the extensions tree of directory structure 151 points to the logically first allocated block AB-20 of FRAGMENT-2 of FILE-2. The last data section 23L of FILE-2 usually occupies only a portion of the last allocated block AB-2N'. The slack area at the end of FILE-2, FRAGMENT-2, is designated as 23S. In some instances there may be an additional slack area 22S at the end of FRAGMENT-1.

Figure 3:
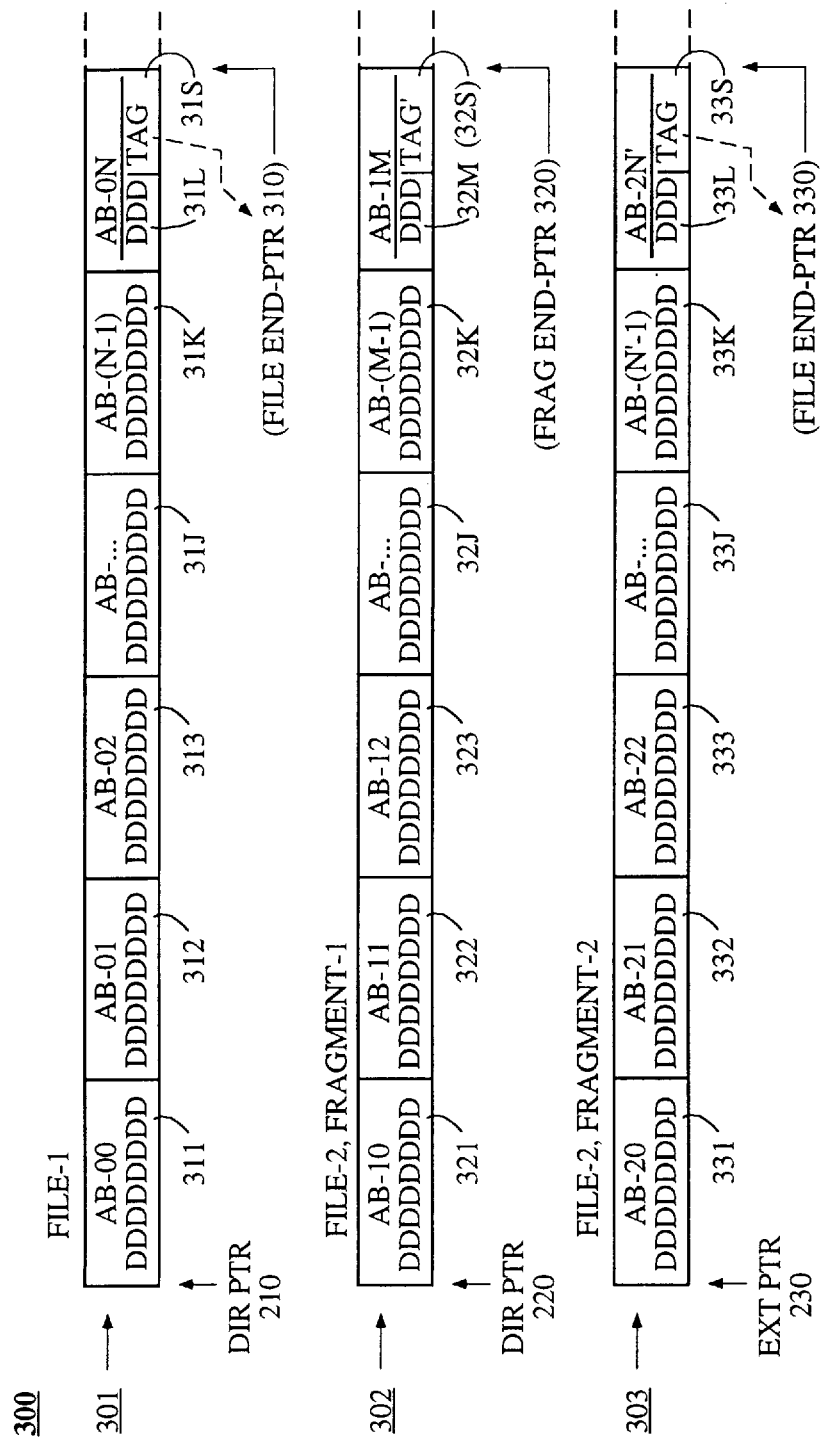
FIG. 3 illustrates a basic data structure of slack-tagged files in accordance with the invention.

FIG. 3 shows a modified data structure 300 in accordance with the invention. Like reference symbols in the '300' number series are used in FIG. 3 to indicate structures having like reference numbers in the '200' number series within FIG. 2. Accordingly, the descriptions for these items are not repeated here.

As seen, unique tagging code (TAG) is recorded in the respective slack areas 31S and 33S of each file having such slack area. If there is slack area 32S at the end of file fragments, that slack area is preferably also filled with a special end-of-fragment tagging code (TAG'). The end-of-fragment tagging code (TAG') 32S can be the same as or different from the end-of-file tagging code (TAG) 33S.

Although not explicitly shown in FIG. 3, it is to be understood that if a file has multiple 'forks', each of those forks may contain slack space and the slack space of any one or all of the forks of a given file may be used for assisting in the reconstruction of the respective forks of that file in the event there is damage to the system's directory structure 151.

As will be seen below, the recorded, unique tagging code or codes (TAG or TAG') of slack areas 31S, 32S and 33S may be used during file recovery operations to create end of file pointers such as 310, 320 and 330.

Although further not shown in FIG. 3, it will become apparent from the below that free-space extents (fragments) such as 157a and 157b of FIG. 1A may be tagged at their ends in a way that is similar to file extents being tagged at their respective ends 32S. Referring to FIG. 1A, if there were a file fragment interposed between free-space extents 157a and 157b, the end-tagging of extent 157a can be used to locate the logical start of the file fragment (not shown) interposed between free-space extents 157a and 157b. If file fragment (not shown) interposed between free-space extents 157a and 157b is later returned to free space, the ends of extent 157a and the returned file fragment should be un-tagged (the EOF tag code should be replaced with a null code such as $00_{hex}$ or $FF_{hex}$) in order to avoid letting the file-recovery mechanism determine that such a file fragment (not shown) lies interposed between free-space extents 157a and 157b.

Figure 4A:
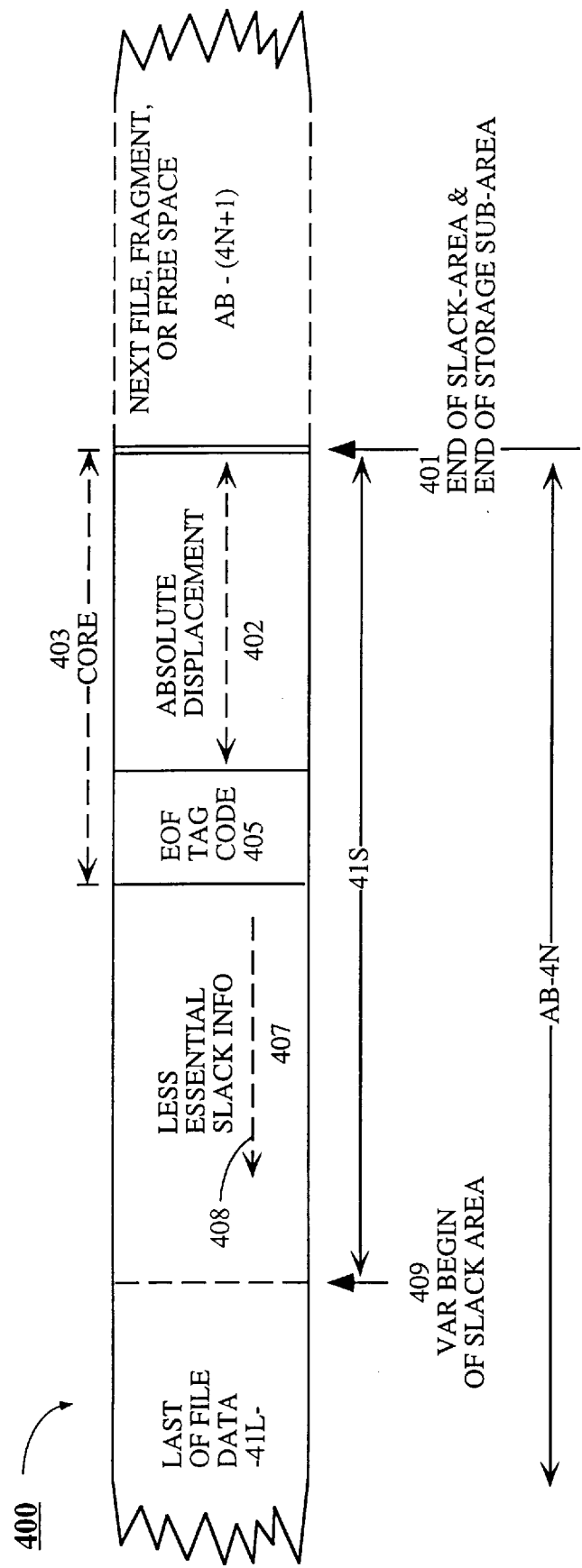
FIG. 4A illustrates a general, first format for tagging the storage slack area in accordance with the invention.

FIG. 4A illustrates a first general manner 400 in which tagging code is recorded into a slack area 41S of each file or file fragment or free space extent. The absolute end of the slack area is denoted as 401. This end of slack area 401 is also the physical end of the storage sub-area (the physical end of the allocated storage block, AB-4N).

An absolute displacement amount 402, as measured from the end of slack area 401, is defined. A unique end-of-file tag code 405 is recorded within the slack area 41S and positioned to be either displaced from the end of slack area 401 by the defined absolute displacement amount 402 or to be contained within the end portion of slack area 41S that is overlapped by the predefined displacement amount 402.

The portion 403 of the slack area tagging information that extends frontwards (to the left in the figure) from the slack area end 401 towards the front of the slack area, and which contains the EOF tag code 405 and other information, if any, that is deemed vital for file recovery is referred to as the 'vital core' 403 of the tagging data.

In one embodiment of the invention (see FIG. 4B), the absolute displacement amount 402 is equal to zero and the unique end-of-file tag code 405 is positioned to abut against the very end 401 of slack area. In this case, the vital core 403 consists of only the EOF tag code 405. However, other values of displacement 402 may be used as will become apparent from the below discussion, in which case the vital core 403 may contain other information.

The bit pattern within the EOF tag code 405 and the positioning 402 of this code 405 relative to the end 401 of the storage sub-area AB-4N qualifies it as an end of file marker (or as an end of file-fragment marker or as an end of free-space-extent marker) for file recovery purposes.

The bit pattern of the EOF tag code 405 is preferably an uncommon one that does not define a repeated common code sequence such as $00_{hex}$ or $FF_{hex}$ or $D6_{hex}$ or $A5_{hex}$ or any other like code sequence that may be found with relatively great likelihood in randomly selected storage sub-areas of the disk subsystem 150 at or within the defined displacement amount 402.

The term 'relatively great likelihood' as used here is intended to mean that the probability of finding the EOF tag code 405 recorded for purposes other than file recovery at (in one embodiment) or within (in another embodiment) the defined displacement distance 402 of a randomly selected storage sub-area is preferably less one out of approximately 128, and more preferably less one out of approximately 256, and even more preferably less one out of approximately 512, and yet more preferably less one out of approximately 1000.

The definition of what constitutes an uncommon code for use as the EOF tag code 405 can vary from one computer to another as will be appreciated by those skilled in the art. In general, the EOF tag code 405 should not be equal to one or a continuous succession of just $00_{hex}$ code or just $FF_{hex}$ code. Put in a slightly different way, the EOF tag code 405 should not include a consecutive sequence of eight (8) bits where each bit is equal to logical zero ('0'), and the EOF tag code 405 should not include a consecutive sequence of eight bits where each bit is equal to logical one ('1'). Examples of uncommon bit patterns for the EOF tag code 405 are per-byte sequences such as $BB_{hex}$ or $CC_{hex}$ or $DD_{hex}$ or $EE_{hex}$. A 4-byte sequence such as $F806599E_{hex}$ should serve well as the EOF tag code 405 in many systems.

Each system may have unique characteristics, however. It is advisable to first test each of a plurality of proposed EOF tag codes 405 against a statistically significant spread of not-yet slack-tagged random access storage devices (RASD's) that nonetheless have actual data stored on them through actual in-the-field use by a given target system. The test is preferably carried by automatic scanning of each of the spread of RASD's to determine which, if any of the proposed EOF tag codes 405 demonstrates an acceptably low, if not the lowest, number of matches with non-slack data of those RASD's. A proposed EOF tag code having such an acceptably low, if not the lowest, number of matches with the non-slack data of the actually used RASD's is then used for that target system.

In FIG. 4A, the actual end of the file data is denoted by line 409. This location 409 also functions as the variable beginning of the slack area 41S. The distance 408 between the EOF tag code 405 and the variable beginning 409 of the slack area 41S may vary from file to file. So-called 'less-essential' slack area information 407 is preferably stored in this variably-sized area 408 as space permits and the less essential slack information 407 grows frontwards toward the last of the file data 41L as indicated by the left-pointing arrowhead of the distance-indicating line 408.

Figure 4B:
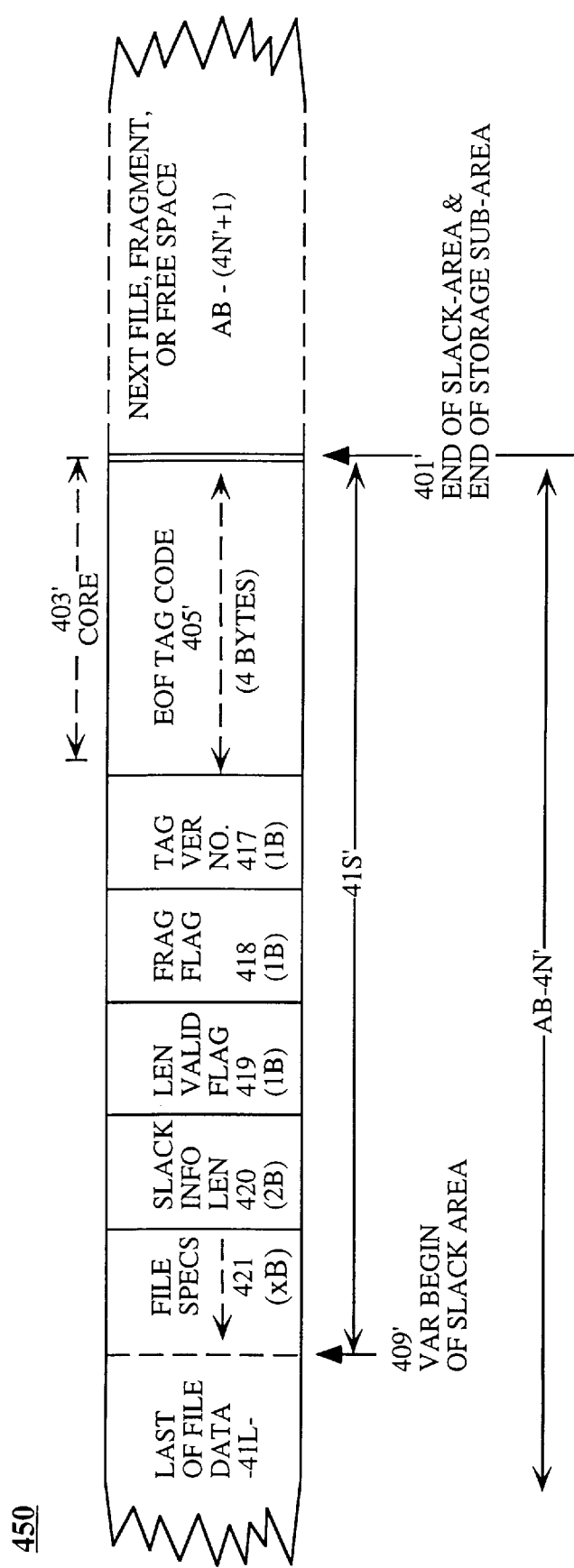
FIG. 4B illustrates a more specific, second format for tagging the storage slack area in accordance with the invention.

FIG. 4B shows one specific implementation 450 in which the EOF tag code 405' is 4 bytes long and abuts against the very end 401' of the last storage sub-area of the file or file fragment in the case where there is a slack space 41S' of at least 4 bytes. (A byte is defined as 8 bits of information data. Additional bits may be used per byte for parity or other error correction.)

The next file or file fragment or free space or free space extent (e.g., 157b) may begin in the very next allocation block, AB-(4N'+1).

Growing frontwards from the front of the EOF tag code 405' towards the front of the current file or current fragment, as slack space permits, there is recorded other slack area information of generally decreasing importance with respect to file recovery. If the file grows in length, the least-essential slack-area information is the first to be obliterated, and then the next least-essential slack-area information is obliterated, and so forth until the end-of-file begins to encroach on the EOF tag code 405'.

In the illustrated embodiment 450, immediately preceding the EOF tag code 405', there is a tag-structure version number 417 (TAG VER. NO.) which is one byte long (1B). The tag structure version number 417 may be used to define the format of the remainder of the slack information within the slack area 41S'.

In one specific version, the byte that next precedes the tag version number area 417 is a one-byte long (1B) fragmentation flag 418. The fragmentation flag 418 indicates whether the corresponding file, for which this is the slack area, is fragmented or not. The fragmentation flag 418 may also optionally indicate the number of fragments. In one set of embodiments, the fragmentation flag 418 alternatively or additionally indicates whether or not the present file may be a 'tag-only file'. Tag-only files are described later below.

Preceding the fragmentation flag 418 there is a length valid flag 419, also one byte (1B) long, which indicates whether a next-preceding area 420 contains valid length information. If flag 419 is set to a unique valid-indicating code, then area 420 may be deemed to contain a valid length value indicating the total number of valid bytes contained within the slack area 41S'. If flag 419 is not set to a valid-indicating code, then area 420 does not contain a valid length value. (It is understood, of course, that although the length valid flag 419 is shown positioned immediately adjacent the length value area 420, the length valid flag 419 can be positioned at any predefined location within the slack space 41S', which location is displaced from the location of the length value field 420, and the length valid flag 419 can nonetheless indicate whether the distally located length value area 420 does or does not contain valid length information. See for example the implementation 480 of FIG. 4E.)

The validated bytes of preceding area 421 (whose length is xB where x is defined by valid data in field 420) are those that may be used by the file recovery mechanism with some assurance that they do not merely contain random 'noise' information. In one embodiment, the slack length area 420 is two bytes (2B) long.

Depending on the remaining space left in the slack area 41S', and the tag-structure version number defined by field 417, a variable number of additional bytes (xB) may be stored in next preceding area 421 for defining additional file specifications.

Figure 4C:
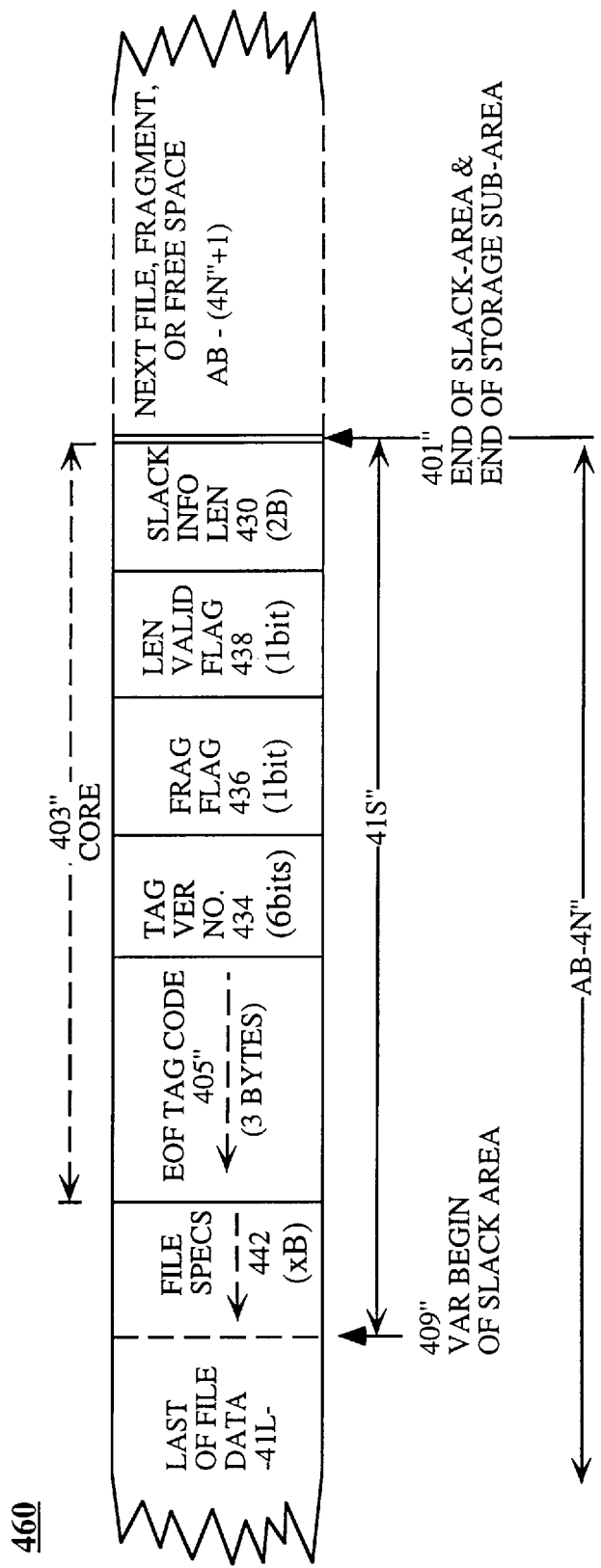
FIG. 4C illustrates a different third format for tagging the storage slack area.
Figure 4D:
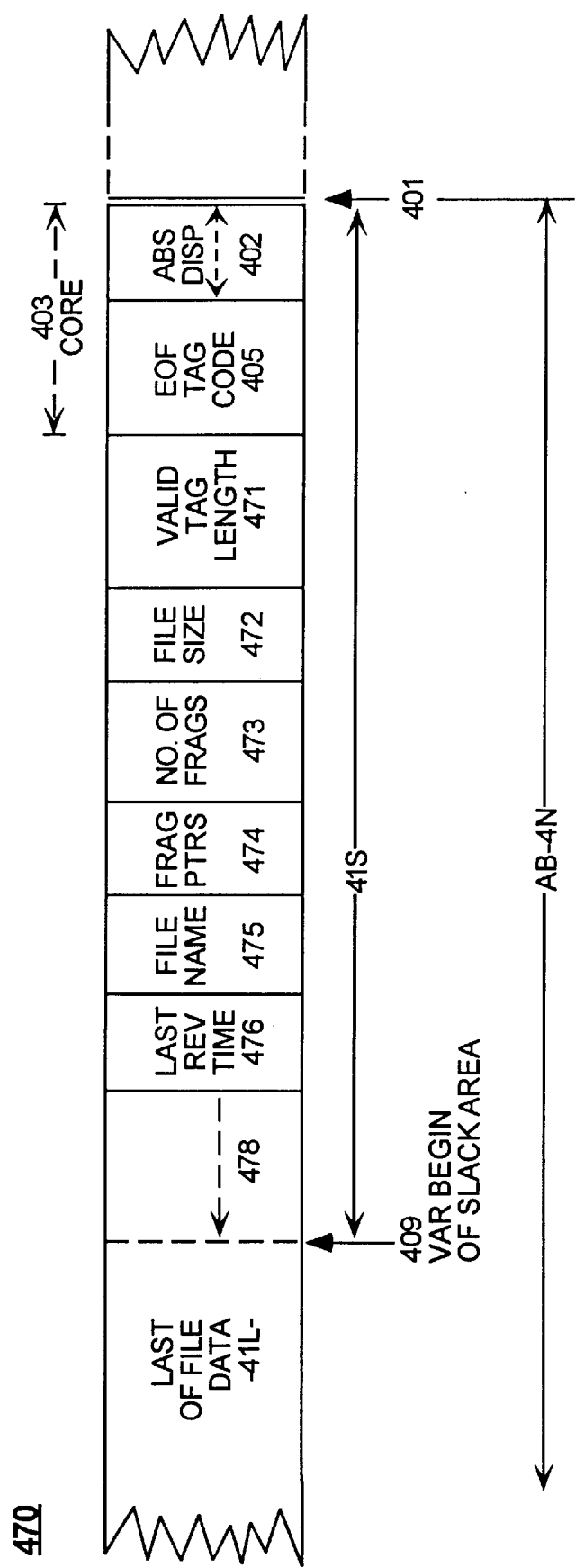
FIG. 4D illustrates a possible supplemental format for frontwards appending of less essential information in a tagged slack area.

FIG. 4D shows one example of what additional file specifications may be recorded in the less-essential, variable area (area 421 of FIG. 4B). In the embodiment 470 as depicted by FIG. 4D, the vital core, 403 of the slack-tagging information is preceded by a first field 471 that indicates the total number of bytes in the slack area 41S and that validates this number with some sort of unique validation flag (e.g., field 419 of FIG. 4B). This first field 471 corresponds to fields 419 and 420 of FIG. 4B but is repeated in FIG. 4D because FIG. 4D also applies to the generalized and specific implementations shown in FIGS. 4A and 4C.

The next-preceding field 472 that indicates the total file size of the current file as expressed in number of bytes.

File-size field 472 is next-preceded in the slack area address space by a third field 473 (NO. OF FRAGS) that defines total number of fragments used for constructing the current file. The number of fragments field 473 may be next-preceded by a corresponding number of fragment pointers (FRAG PTRS) 474 that respectively point to the beginnings of the first file fragment, second file fragment, and so forth. If further room remains in the slack space 41S, further file specifications such as the file's primary name 475, the file's last time and/or date of revision 476 and other file attributes 478 may be further stored in such decreasing order of importance in the variable area (area 421 of FIG. 4B).

FIG. 4C shows another structure 460 in accordance with the theme of FIG. 4A. Starting at the end 401" of the storage sub-area and working frontwards, there is a two-byte wide (2B) field 430 that may contain, if properly validated, the value in terms of bytes of the length of the remainder of the slack information area. Preceding this there is a one-bit length (1-bit) valid flag 438 which indicates whether or not the data in field 430 is to be considered valid. Preceding this there is a one-bit (1-bit) fragmentation flag 436 which indicates whether the corresponding file for which this is the last storage sub-area is fragmented or not. Preceding this there are six bits (6-bits) of information forming a tag version number 434. The tag version number 434 indicates to the data recovery mechanism what data structure to expect in the remainder of this tagged slack area. The end-of-file unique tag code 405" precedes field 434 and consumes three additional bytes (3B).

The total length of fields 430, 434, 436, 438 and 405' is therefore six bytes (6B). This length of six bytes is the minimum required slack space for supporting the vital core 403" of the slack tag data structure 460 of FIG. 4C.

Preceding the EOF tag code area 405' is the variable file specification area 442 whose structure is defined by the tag version number 434 and whose length is defined by the validated slack information length field 430. As before, the variable file specifications area 442 may extend frontwards in storage space up to but not beyond the end of the actual data file 41L, which end defines the variable beginning 409" of the slack area in this last allocated block AB-4N". The contents (xB) of variable file specifications area 442 may be constructed the same as or approximately similar to field 472–476 of FIG. 4D.

Figure 4E:
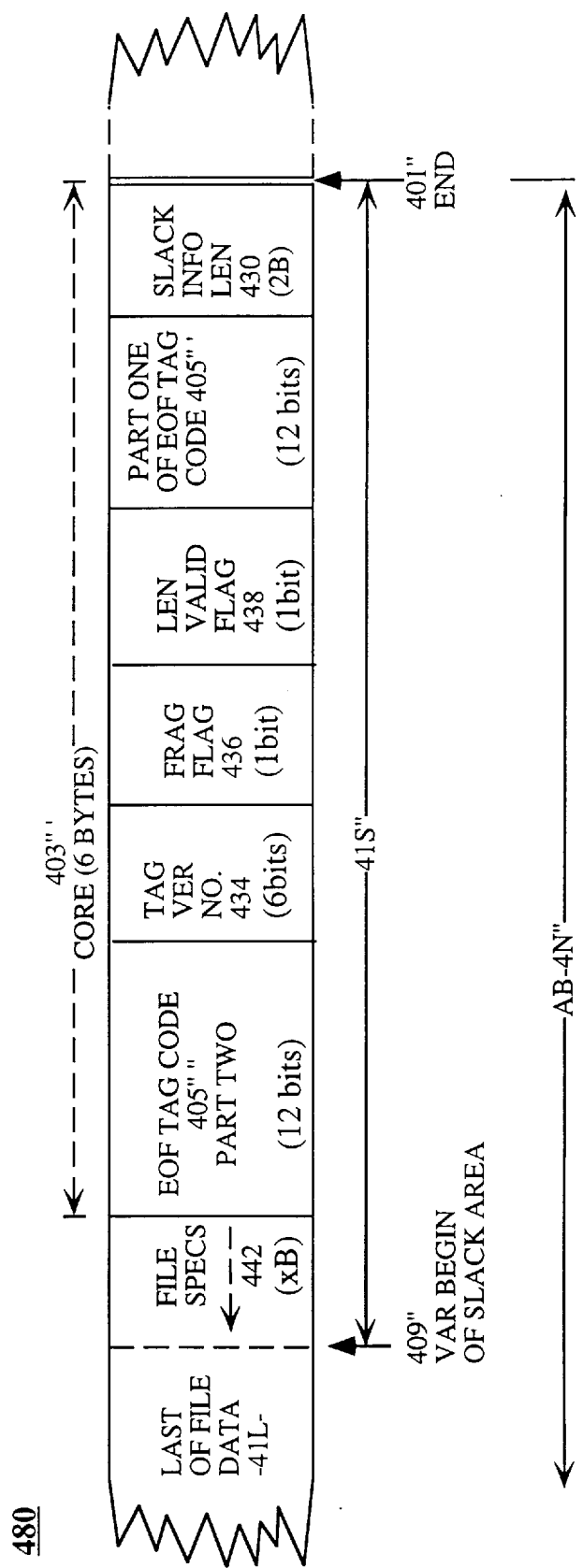
FIG. 4E illustrates a different fourth format for tagging the storage slack area, wherein a unique EOF tag code is uniquely distributed across plural byte boundaries of a file's slack area.

FIG. 4E shows another variation on the theme of FIG. 4C. In the embodiment 480 of FIG. 4E, the 24 bit wide EOF tag code 405 is distributed in spaced apart manner across the extent of the vital core 403 so as to define at least first and second separated EOF parts, 405'" and 405"". Each of the first and second separated EOF parts, 405'" and 405"", extends across a byte boundary. The idea here is to minimize the likelihood of the EOF parts, 405'" and 405"", being randomly found so positioned in a storage sub-area that is not the last logical storage sub-area of a randomly selected file of the RASD.

The following two examples illustrate additional data structures that may be used for the non-core, 'less-essential' slack area information portion 407 of, for example, FIG. 4A given a file system that uses two or more forks in each named file. In these two DST (Data Slack Tag) examples, the following C language definitions apply.

```
    uint      unsigned integer, 2 bytes long
    int       signed integer, 2 bytes
    char      character, 1 byte
    ulong     unsigned long integer, 4 bytes
    long      signed long integer, 4 bytes
    OSType    operating system file structure, 4 bytes long
    Point     pointer type, 4 bytes
An 'ExtentRec' is defined to have the following data structure:
    uint      extentStart;   // Starting allocation block number
                             // of next extent following this
                             // fork if this extent-record
                             // resides in the slack area of a
                             // fork having corres-
                             // ponding next extent.
    uint      extentLength;  // Length of extent in
                             // allocation blocks.
```

Also, in the following two examples, more critical information is placed closer to the top of each list while less critical information is placed closer to the bottom of each list. The corresponding positioning in storage space is, of course the other way, with more critical information being placed closer to the end of each TAG area and less critical information being placed closer to the front of each TAG area. A number of the recovery items listed below (such as fdFlags, fileFlags, fileFlNum and fileClpSize) are specific to the Macintosh™ HFS system and are included here for purpose of illustration. Other operating systems and file structures may call for somewhat different arrangements of recovery-assisting data in the slack area.

EXAMPLE 1

```
******  The Non-Core DST information includes the following data
in the shown order (most critical closest to top of list):
    ulong     thisLogicalLen;   // Identifies the logical EOF
                                // (End of Fork data) of this
                                // fork.
    uint      thisExtentCount;  // Defines the number of
                                // extents that follow this
                                // fork.
    ExtentRec thisExtents [] ;  // This is an array of zero
                                // or more ExtentRecs for
                                // this fork as defined
                                // by this ExtentCount.
    ulong     otherLogicalLen;  // Identifies the logical EOF
                                // of another selected fork
                                // of this file, if any.
    uint      otherExtentCount; // Defines the number of
                                // extents in the
                                // selected other fork.
    ExtentRec otherExtents [] ; // This is an array of zero
                                // or more ExtentRecs for the
                                // selected other fork as
                                // defined by
                                // otherExtentCount.
    OSType    fdType;           // File type (as defined by
                                // directory structure).
    OSType    fdCreator;        // File creator's name.
    uint      sectorsPerBlock;  // Number of sectors that
                                // make up each allocation
                                // block.
    int       fdFlags;          // More-Critical File system
                                // flags.
    ulong     fileCrDat;        // This file's creation date.
    ulong     fileMdDat;        // File's last modification
                                // date;
    ulong     fileBkDat;        // File's last backup date.
    Point     fdLocation;       // File's icon location as
                                // last shown in GUI.
    char      fileFlags;        // Less-Critical File system
                                // flags.
    ulong     fileFlNum;        // File number.
    int       fdComment;        // Resource identification
                                // number for this
                                // file's comment file.
    long      fdPutAway;        // Original Home of the file
                                // (if its icon is displaced
                                // to a desktop area).
    uint      fileClpSize;      //   File's clump
                                          size (0 if
                                //  uses default clump
size)
*************
```

The below second example removes the backup information in one fork for the file's other fork. In this case, file reconstruction may use the valid file ID numbers to re-associate file forks that belong together. (Notice that the otherXxxxx fields are removed and that fileFlNum is promoted to a more critical position).

EXAMPLE 2

```
******* Non-Core DST information consists of:
    4 bytes      thisLogicalLen;    // Logical EOF of this fork
    2 bytes      thisExtentCount;   // Number of extents for this
                                    //   fork
    4 bytes      thisExtents [];    // Array of zero or more
                                    //   ExtentRecs for this fork
    4 bytes      fileFlNum;         // File number
    4 bytes      fdType;            // File type
    4 bytes      fdCreator;         // File creator
    2 bytes      sectorsPerBlock    // Number of sectors that
                                    //   make each block
    2 bytes      fdFlags;           // More-critical file system
                                    //   flags
    4 bytes      fileCrDat;         // File's creation date
    4 bytes      fileMdDat;         // File's modification date
    4 bytes      fileBkDat;         // File's last backup date
    4 bytes      fdLocation;        // File's location in GUI
    1 byte       fileFlags;         // Less-critical file system
                                    //   flags.
    2 bytes      fdComment;         // Resource ID of the file's
                                    //   comment file
    4 bytes      fdPutAway;         // Original Home of the file
                                    //   (if moved to desktop)
    2 bytes      fileClpSize;       // File's clump size (0 if
                                    //   uses default clump size
*****************
```

Note that the sectorsPerBlock field is redundant in that it is repeated in each of the tags of each of the files. It could be demoted to a low position in the tag or moved to a preferences file that could be found by the recovery engine. It's not important to have this field repeated in each tag (as it will be the same for all tags on the same logical volume), but it's very important to have this information saved at least in one place for recovery purposes.

Another variation on the non-core data structures would be to replace the fdcomment field with the actual comment (rather than relying on the comment database being recovered).

Yet another variation could include a length prefixed list of parent ID's to facilitate reconstruction of the volume's folder hierarchy (in other words to define where in a hierarchy of directories or folders the present file resides).

Optionally, the original folder names could also be stored to avoid use of meaningless generic folder names in a recovered hierarchy.

The fdPutAway field may contain a directory number or a pathname, or both for identifying a Put_away location to which the file's folder is to be returned on shutdown if the graphical icon of the present file had been moved out onto a non-foldered area of the GUI desktop (Graphical User Interface).

Other non-reserved fields in the catalog entry could be recorded in the tag and restored during recovery in case some system extension was using them. This reserved-area information would likely be the least critical data in a tag.

FIG. 5 shows a flow chart of a file recovery method 500 in accordance with the invention. Method 500 begins at step 501 following a determination that a damaged directory structure 151' (FIG. 1B) exists and that reconstruction is desirable. Typically, a floppy disk or CD-ROM or other like program loading mechanism 130' (FIG. 1B) is used to load a recovery program 145' into the system memory 140 of the damaged system 100'. Recovery program 145' instructs the system processing unit (CPU) 120 to carry out method 500.

At step 502, the unique end of file tag code (e.g. 405 or 405' or 405" or spaced-apart parts 405''' and 405"") that should have been created earlier in time within the slack areas 41S of files prior to the damaging of the directory 151' is defined. An expected displacement amount is also defined.

The defined displacement amount of step 502 can represent either an absolute displacement 402 at which an EOF tag code 405 such as shown in FIG. 4A must be found or the defined displacement amount of step 502 can represent a maximum frontwards-scan distance within which an EOF tag code 405 must be found as will be explained shortly.

At step 504 a first storage sub-area (e.g. an allocatable media block) of the damaged disk sub-system 150' is read.

At step 510 the read storage sub-area is scanned from the physical end 401 of the sub-area frontwards, looking for the defined EOF tag code (405). There are two possible ways to perform the frontwards scanning here.

According to a first embodiment, the defined displacement value is taken as an absolute displacement value at which the EOF tag code must be found. If the EOF tag code 405 is not found at that location, path 511 is taken back to step 540 and the just-read sub-area is designated as not containing an EOF tag code.

In another embodiment, the just-read storage sub-area is scanned from its physical end 401 frontwards up to but not beyond the defined maximum frontwards-scan distance to see if the define EOF tag code (405) exists within that limited frontwards-scan distance. If the answer is NO, path 511 is again taken down to step 540. The method of this second embodiment may be used when it is not known with certainty what specific data structure has been used for tagging the slack area 41S but it is known that the EOF tag code, if it is present, will be located say, no more than 6 bytes before the end 401 of slack area. The EOF tag code may be located anywhere within such a frontwards-scan distance such as at 405 of configuration 400 (FIG. 4A) or at 405' of configuration 450 (FIG. 4B) or at 405" of configuration 460 (FIG. 4C).

The first embodiment is preferred when it is known what the format of the slack tagging method was. Requiring the EOF tag code 405 to be positioned at a specific displacement relative to the end of the slack area 401 lessens the chance that random data in a random storage sub-area will match the defined EOF tag code. Also, if the EOF tag code 405 is uniquely distributed across several byte boundaries, as shown for example in FIG. 4E, that further lessens the chance that random data in a random storage sub-area will match the defined EOF tag code and its unique positioning.

In a variation on the above, the scan frontwards operation 510 may be carried out using a predefined set or a predefined range of expected displacement amounts 402.

If the test at step 510 produces a positive result (YES), meaning that the predefined EOF tag code has been found at or within the defined displacement as taken relative to the end 401 of the storage sub-area, then the algorithm proceeds to step 520.

In step 520, the physical location of the current sub-area is recorded as the location of a sub-area that is probably the last sub-area of a file or a file fragment. (The physical location of the current sub-area is preferably recorded on a recovery-assisting floppy disk 130' or another crash-safe memory means in addition to being recorded in system memory 140.) The algorithm may additionally or alternatively record the next sub-area as being the probable first sub-area of a next file or file fragment or the beginning of free space or of a free space fragment.

Subsequent steps 530 and 535 are optional depending on whether additional information other than the EOF tag code has been recorded in and recovered from the slack area 41S.

At step 530, the algorithm looks in the area adjacent to the found EOF tag code for a tag format version number (e.g. 417 or 434) and for a length valid flag (e.g. 419 or 438). The tagging format version number (417 or 434) indicates the location of the length valid flag (419 or 438).

At step 535, if the adjacent version number (417 or 434) is a recognizable valid version number, and/or the length valid flag is set true, the additional validated information in the slack area 41S is gathered and further recorded as appropriate. (The information is preferably recorded on a recovery-assisting floppy disk 130' or another crash-safe memory means in addition to being recorded in system memory 140.)

The length valid flag does not have to be set true in order for step 535 to provide useful information. Note that in the slack tagging format 460 of FIG. 4C, the fragmentation flag 436 will indicate whether or not this is the end of a fragment as opposed to being the end of a contiguous file. This information by itself may be useful for recovery operations.

At step 540 a test is performed to see if there are any more storage sub-areas to be checked. If the answer is YES, path 541 is taken back to step 504 where the next such storage sub-area is read.

If the answer is NO, then the algorithm proceeds to step 550 wherein the recorded data is used either alone or in conjunction with other recovery data to attempt a reconstruction of the file structure on the damaged random access storage device 150'. The other recovery data may be that which is generated by a masked search algorithm.

Referring back to FIG. 3, note that the recorded data of step 520 generates a file end-pointer 310 which points to the probable end of, for example, FILE-1. The information recorded in step 535 may include the file size, the number of fragments and their locations, the file name, the file's last revision date & time and other attributes of FILE-1. These may be used for reconstructing the lost directory pointer 210 and other data of the damaged directory structure 151'. Similar information may be used for reconstructing fragmented files such as FILE-2.

Referring to FIG. 6, a global slack tagging method 600 is now described. Step 601 is entered when it is desirable to add slack tags to a previously untagged random access device (RASD) or to refresh the slack tags of a previously tagged RASD. The latter instance may occur, for example, immediately or soon after defragmentation of the storage device's files.

At step 602, file structure information is obtained from the system directory structure 151. If this is the first time step 602 is being entered in procedure 600, the fetched information is that of the first file described in the directory structure. If not, it is the next file. If there is no next file, an exit is made through step 660.

At step 604, the file structure is analyzed to determine if there is minimal slack room for writing the vital core 403 of the tagging information.

If the answer is NO, one possibility is that the file being presently looked at is a so-called "tag-only file". Tag-only files will be described in more detail momentarily. There can be two kinds, old and new.

At step 605, if it is determined that the present file is an old "tag-only" file, the algorithm proceeds to step 606. A "tag-only file" can be considered "old" if it has not been created within, for example, the last hour, or the last three hours, or the last six hours, or the last twelve hours. The definition will vary according to approximately how long it takes to complete the global tagging or re-tagging method 600. A "tag-only file" that is created by a current running of method 500 is considered "new". If the file under investigation is a new tag-only file, control is returned by way of path 603 to step 602. If the file under investigation is an old tag-only file, at step 606 the old tag-only file is deleted and control is returned by way of path 603 to step 602.

If at step 605 it is determined that the current file under investigation is not a tag-only file, but nonetheless there is not enough slack room, the algorithm continues to step 607.

At steps 607 and 609 a determination is made as to whether the system user wishes to create a tag-only file in the case where investigated files do not have sufficient slack room of their own. A "tag-only file" is one that does not have user information on its own but merely contains slack-tagging information for other, slackless files. The slack-tagging information is placed beginning at the end of the last storage sub-area of the tag-only file and builds forward toward the beginning of such a tag-only file. The user may elect to create one tag-only file for each slackless user file or to create one tag-only file for all slackless user files of the given RASD. These selections may be made with a mode flag that is set prior to entry of step 601 or the user may be queried interactively to make a determination at the time that steps 607 and 609 execute.

If the answer at step 607 is YES, meaning the user wishes to create one tag-only file for each slackless user file, then the algorithm proceeds to step 608 where a new tag-only file is created. Next, at step 610, the algorithm points to the absolute end of the tag-only file that was created by step 608. If step 610 is entered instead from step 609, the pointed-to position in the tag-only file is slightly different.

If the answer at test step 607 is NO, the algorithm proceeds to step 609 where a determination is made whether the user wishes to have only one tag-only file for all slackless user files of the given RASD. If the answer is NO, the algorithm returns by way of path 603 to step 602.

If the answer at test step 609 is YES, the algorithm proceeds into step 610. If a new tag-only file has not yet been created, it is now created. A search is carried out starting at the tail end of the tag-only file and moving toward its beginning to find the next place where slack tag information may be written without overwriting previous slack tag information. If this is the first time that step 610 is being entered from step 609, that position will be the very end 401 of the just-created tag-only file. If other slack tag information had been written into the tag-only file, the next available area within the tag-only file is pointed to.

It should be noted that use of the tag-only file is relatively rare. Under normal conditions, most files will have the minimal slack room to support vital core 403 and algorithm 600 will rarely flow through steps 605, 607 or 609. Most of the slack tagging information will be written into the actual slack area of the respective files rather than into a tag-only file. Thus, the general objective of the invention, which is to advantageously use the slack area of files for storing recovery information, will be mostly preserved even if on occasion a tag-only file is created and it consumes some of the previous free-space of the random access storage device.

If the answer at step 604 is YES, meaning there is at least minimal slack room in the slack area of the file under investigation for writing the vital core of the slack tag, the algorithm proceeds along the more frequently used path 614 to step 615. At step 615, the algorithm points to the very end 401 of the slack area 41S.

Step 620 is entered into either from step 615 or 610. In step 620, a preliminary copy of the vital core 403 of the tag information is constructed within system memory 140. If the vital core includes a length validating flag 438, that flag 438 is initially set to FALSE. If the vital core 403 further includes a slack length field 430, that length information 430 is initially set to zero.

At next step 625, it is determined whether the slack area 41S contains additional room for holding more than the vital core 403. If the answer is NO, the algorithm proceeds to step 650.

If the answer at step 625 is YES, the algorithm proceeds to step 630. In step 630, a determination is made as to how much extra room (xB) the slack area 41S has for less essential information. If the vital core. 403 includes either of the slack length field 430 or the length valid flag 438, these are appropriately set to indicate a validated length equal to one allowed by the extra room in the slack area 41S. Additional non-vital tag information is inserted in front of the vital core 403 of the RAM-resident version to the extent that the extra room in the slack area 41S permits.

At step 650 the RAM-resident version of the slack tagging information is written into the slack area 41S of the random access storage device (e.g. of the disk).

Next, the algorithm returns from step 650 by way of path 603 to step 602 to get the file structure information from the directory structure for the next file. If there are no more files, an exit is taken by way of step 660.

Figure 7:
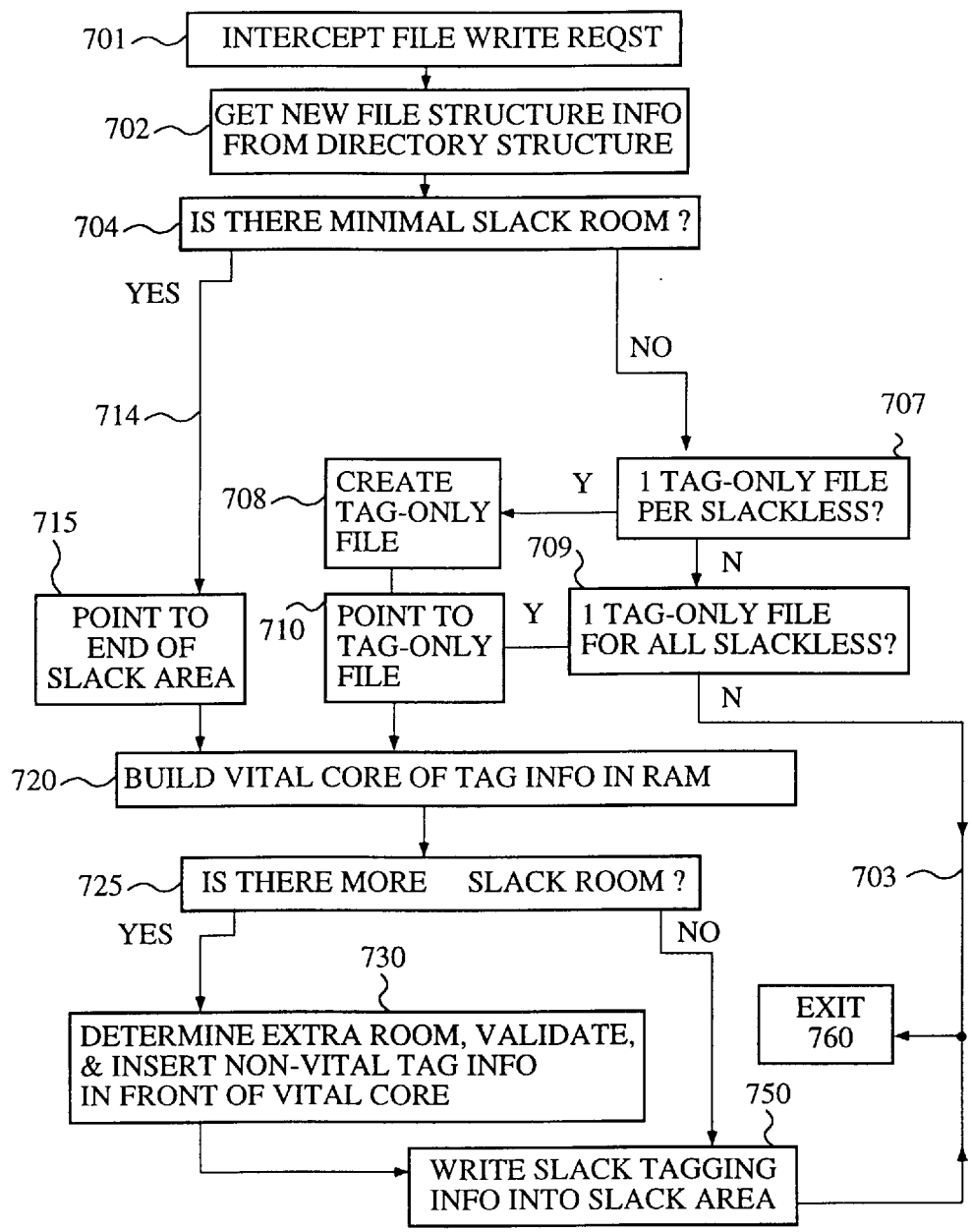
FIG. 7 is a flow chart of a second slack area tagging method in accordance with the invention.

FIG. 7 shows an alternate method 700 for writing tagging information into the slack area 41S of each file on a file-by-file basis rather than globally. Like reference numerals in the "700" series are used in FIG. 7 for elements having corresponding structures similarly numbered in the "600" number series in FIG. 6. The description of FIG. 7 will be accordingly abbreviated here.

Entry step 701 intercepts application program calls to the operating system (OS) for changing the description of a file structure in the system directory structure 151. The intercept may be made upon the call to the operating system service. The intercepting program allows the operating system to complete the requested directory-changing function, but then it redirects the return to step 702. A return to the calling program is later made at exit step 760.

Various methods exist in the art for carrying out such interception of operating system calls. A detailed description may be found, for example, in the above-cited application of L. Cohen, Ser. No. 08/518,191.

At step 702 the newly modified information in the directory structure 151 for the file is fetched. In the following steps 704 and on, the slack area is filled to the extent available with tagging information, including perhaps the new size of the modified file and its new last-revision time and date. After the new slack-tagging information is written into the slack area at step 750, an exit is made by way of step 760.

The above disclosure is to be taken as illustrative of the invention, not as limiting its scope or spirit. Numerous modifications and variations will become apparent to those skilled in the art after studying the above disclosure.

By way of example, although FIG. 3 shows unique tagging code (TAG) being recorded in the respective slack areas 31S and 33S of each file having such slack area and also special tagging code (TAG') being optionally recorded in the file area 32S at the ends of respective file fragments, similar free-space tagging code (e.g., TAG", not shown) can be optionally and additionally recorded at the ends of free space areas such as 157a and 157b of FIG. 1A. The free-space tagging code (e.g., TAG", not shown) is configured in the same way as the file tagging code (TAG, TAG') to identify a contiguous block of free space sub-areas. The file recovery software can use the free-space tagging code to distinguish between storage sub-areas that store file information and storage sub-areas that define free-space.

By way of a further example, rather than creating one or more tag-only files as is done at steps 607 and 609 of FIG. 6, and thereby consuming space in the directory structure 151 for defining such a one or more tag-only files, the tag-only information can be alternatively stored at a predefined end-portion of free space 157. (The predefined end-portion could be the end of a free space fragment, say 157b, at a predefined time point). Such within-free-space tag-only information would be grown towards the front of free space 157. As time progresses, and the logical front of free space 157 (the oldest contiguous portions of free space 157) is removed from free space and recaptured for storing new file data, and as new storage sub-areas are appended to the old end of free space 157, the relative position of the tag-only information within the free space 157 will change. Eventually, the within-free-space tag-only information will reside in that portion of free space 157 that is next to be recaptured for storing new file data. In order to lessen the chance that the within-free-space tag-only information will be destroyed by recapture of free space, the within-free-space tag-only information is periodically copied so as to create a coexisting duplicate at the new end of free space 157, to the extent that such new space allows. The co-existence of redundant within-free-space tag-only information will not hamper file recovery operations. The file recovery program 145' can be configured to ignore duplicated tagging information.

Given the above disclosure of general concepts and specific embodiments, the scope of protection sought is to be defined by the claims appended hereto.

What is claimed is:

1. A tagging method for application to a random access storage device having plural pre-allocated storage sub-areas across which plural files are recorded, said method comprising the steps of:
   (a) locating a logically-last storage sub-area of at least one of the files whose data is stored across the pre-allocated storage sub-areas of the random access storage device;
   (b) determining if and how much storage slack space is available in the logically-last storage sub-area;
   (c) in response to said determination of the available slack space, recording an end-of-file tagging code in the slack space, if sufficient slack space is available for such an end-of-file tagging code.

2. The tagging method of claim 1 wherein said storage slack space has a variably positioned beginning and an opposed end and said step (c) of recording includes:
   (c.1) recording the end-of-file tagging code within the slack space at a position that is displaced from the end of the slack space by a non-zero, predefined displacement amount.

3. The tagging method of claim 1 further comprising, before said step (c) of recording, the additional step of:
   (d) defining the end-of-file tagging code as a unique sequence of bits that is not commonly found in the majority of slack spaces of said random access storage device.

4. The tagging method of claim 3 wherein:
said unique sequence of bits does not include a consecutive sequence of eight bits each equal to logical zero; and
said unique sequence of bits does not include a consecutive sequence of eight bits each equal to logical one.

5. The tagging method of claim 3 wherein:
said unique sequence of bits does not include a consecutive sequence of eight bits defining a byte having the hexadecimal value, $D6_{hex}$.

6. The tagging method of claim 5 wherein:
said unique sequence of bits does not include a consecutive sequence of eight bits defining a byte having either the hexadecimal value, $D6_{hex}$, or the hexadecimal value, $A5_{hex}$.

7. The tagging method of claim 1 wherein said end-of-file tagging code is recorded in the slack space as first file-recovery assisting information and the method further comprises the step of:
  (d) further recording other file-recovery assisting information in the slack space as the available slack space permits.

8. The tagging method of claim 7 wherein said other file-recovery assisting information that is recorded includes one or more items in the group consisting of:
  (d.1) a tag-structure version number for defining a format used for a remainder of the other file-recovery assisting information;
  (d.2) a fragmentation flag for indicating whether the corresponding file, within whose slack space the fragmentation flag resides, is fragmented or not; and
  (d.3) a length value field for indicating the total number of bits of valid information contained within the slack space.

9. The tagging method of claim 8 wherein said other file-recovery assisting information further includes:
  (d.4) a valid flag positioned at a predefined location within said slack space for indicating whether a neighboring subregion of the slack space does or does not contain valid information.

10. The tagging method of claim 7 wherein said other file-recovery assisting information that is recorded includes one or more items in the first group consisting of:
  (d.1) a file-size field for indicating the total file size of the corresponding current file, within whose slack space the file-size field resides;
  (d.2) a number of fragments field for defining a total number of fragments used for forming the current file;
  (d.3) a plurality of fragment pointers for respectively pointing to a respective plurality of file fragments forming the current file;
  (d.4) a primary name of file field for specifying a primary name given to the current file; and
  (d.5) a last time of revision specifying field for specifying a time when the current file was last revised.

11. The tagging method of claim 10 wherein said storage slack space has a variably positioned beginning and an opposed end and said other file-recovery assisting information that is recorded includes one or more items in the second group consisting of:
  (d.6) a tag-structure version number for defining a format used for a remainder of the other file-recovery assisting information;
  (d.7) a fragmentation flag for indicating whether the corresponding file, within whose slack space the fragmentation flag resides, is fragmented or not; and
  (d.8) a length value field for indicating the total number of bits of valid information contained within the slack space; and
wherein at least one member of said second group of other file-recovery assisting information is positioned closer to the end of the slack space than any member of said first group of other file-recovery assisting information.

12. The tagging method of claim 10 wherein said storage slack space has a variably positioned beginning and an opposed end and said step (c) of recording includes:
  (c.1) recording the end-of-file tagging code at a position that is closer to the end of the slack space than any member of said first group of other file-recovery assisting information.

13. The tagging method of claim 7 wherein:
said at least one file can be composed of multiple forks or multiple fragments or both;
said step (a) of locating further includes locating additional logically-last storage sub-areas of respective additional forks or additional fragments of the at least one file, other than the logically-last storage sub-area of said logically-last fork or logically-last fragment of the at least one file;
said step (b) of determining further includes determining if and how much additional storage slack space is available in each of the located additional logically-last storage sub-areas;
said step (c) of recording further includes, in response to said determination of the available additional slack space, recording an end-of-fragment tagging code in the additional slack space, if sufficient slack space is available for such an end-of-fragment tagging code;
said step (d) of further recording includes additionally recording other file-recovery assisting information in the additional slack space as the available additional slack space permits; and
said other file-recovery assisting information that is recorded includes one or more items in the first group consisting of:
  (d.1) an end-of-this-fork/fragment identifier for identifying the logical end of data of the respective fork or fragment using the storage sub-area in which said end-of-this-fork/fragment identifier resides;
  (d.2) a further-extents-of-this-fork/fragment identifier for identifying the number of further forks or fragments if any that logically extend beyond the respective fork or fragment using the storage sub-area in which said further-extents-of-thisfork/fragment identifier resides; and
  (d.3) a number of for-this-fork/fragment extent-records, said number being equal to that identified by the further-extents-of-this-fork/fragment identifier, each for-this-fork/fragment extent-record including a for-this-fork/fragment extent-pointer pointing to the start of the corresponding fork or fragment that logically extends beyond the respective fork or fragment using the storage sub-area in which said for-this-fork/fragment extent-pointer resides.

14. A tagging method for application to a random access storage device having plural pre-allocated storage sub-areas across which plural files are recorded, said method comprising the steps of:
  (a) locating a logically-last storage sub-area of at least one of the files whose data is stored across the pre-allocated storage sub-areas of the random access storage device:

(b) determining if and how much storage slack space is available in the logically-last storage sub-area:

(c) in response to said determination of the available slack space, recording an end-of-file tagging code in the slack space, if sufficient slack space is available for such an end-of-file tagging code: and (d) further recording other file-recovery assisting information in the slack space as the available slack space permits: wherein:

(a.1) said at least one file can be composed of multiple forks or multiple fragments or both:

(a.2) said step (a) of locating further includes locating additional logically-last storage sub-areas of respective additional forks or additional fragments of the at least one file, other than the logically-last storage sub-area of said logically-last fork or logically-last fragment of the at least one file:

(b.1) said step (b) of determining further includes determining if and how much additional storage slack space is available in each of the located additional logically-last storage sub-areas;

(c.1) said step (c) of recording further includes, in response to said determination of the available additional slack space, recording an end-of-fragment tagging code in the additional slack space, if sufficient slack space is available for such an end-of-fragment tagging code;

(d.1) said step (d) of further recording includes additionally recording other filerecovery assisting information in the additional slack space as the available additional slack space permits: and (d.2) said other file-recovery assisting information that is recorded includes one or more items in the first group consisting of:

(d.21) an end-of-this-fork/fragment identifier for identifying the logical end of data of the respective fork or fragment using the storage sub-area in which said end-of-thisfork/fragment identifier resides:

(d.22) a further-extents-of-this-fork/fragment identifier for identifying the number of further forks or fragments if any that logically extend beyond the respective fork or fragment using the storage sub-area in which said further-extents-of-this-fork/fragment identifier resides: and (d.23) a number of for-this-fork/fragment extent-records, said number being equal to that identified by the further-extents-of-this-fork/fragment identifier, each for-thisfork/fragment extent-record including a for-this-fork/fragment extent-pointer pointing to the start of the corresponding fork or fragment that logically extends beyond the respective fork or fragment using the storage sub-area in which said for-this-fork/fragment extentpointer resides:

(d.23a) wherein each for-this-fork/fragment extent-record further includes a forthis-fork/fragment extent-length specifier for specifying the logical length of data in the corresponding fork or fragment that logically extends beyond the respective fork or fragment using the storage sub-area in which said for-this-fork/fragment extent-length specifier resides.

15. The tagging method of claim 7 wherein said random access storage device further has a directory structure for locating the pre-allocated storage sub-areas of each of said plural files and for optionally assigning one or more attributes to each such file and wherein said other file-recovery assisting information that is recorded includes one or more items in the group consisting of:

(d.1) a file-type specifying field for specifying a file-type for the at least one file, said file-type specifying field being for reconstructing a corresponding file-type attribute field of the directory structure in the case where the directory structure is damaged;

(d.2) a file-creator specifying field for specifying a file-creator for the at least one file, said file-creator specifying field being for reconstructing a corresponding file-creator attribute field of the directory structure in the case where the directory structure is damaged;

(d.3) a finder-flags specifying field for specifying one or more finder-flags for the at least one file, said finder-flags specifying field being for reconstructing a corresponding finder-flags attribute field of the directory structure in the case where the directory structure is damaged;

(d.4) a file-creation-time specifying field for specifying a creation-time for the at least one file, said file-creation-time specifying field being for reconstructing a corresponding file-creation-time attribute field of the directory structure in the case where the directory structure is damaged;

(d.5) a file-last-modification-time specifying field for specifying a last-modification-time for the at least one file, said file-last-modification-time specifying field being for reconstructing a corresponding file-last-modification-time attribute field of the directory structure in the case where the directory structure is damaged;

(d.6) a file-last-backup-time specifying field for specifying a last-backup-time for the at least one file, said file-last-backup-time specifying field being for reconstructing a corresponding file-last-backup-time attribute field of the directory structure in the case where the directory structure is damaged.

16. The tagging method of claim 7 wherein said random access storage device further has a directory structure for locating the pre-allocated storage sub-areas of each of said plural files and for optionally assigning one or more attributes to each such file and wherein said files are accessible through a graphical user interface (GUI) and further wherein said other file-recovery assisting information that is recorded includes one or more items in the group consisting of:

(d.1) an icon-location specifying field for specifying one or more icon-locations associated with the at least one file, said icon-location specifying field being for reconstructing a corresponding icon-location attribute field of the directory structure in the case where the directory structure is damaged, said icon-location attribute field being for indicating one or more locations in the GUI of a corresponding one or more icons representing the at least one file;

(d.2) a file__system flags specifying field for specifying one or more file__system flags for the at least one file, said file__system flags specifying field being for reconstructing corresponding file__system flags of the directory structure in the case where the directory structure is damaged, said file__system flags of the directory structure serving as global system flags for the corresponding file;

(d.3) a file__system file-identification-number specifying field for specifying a file__system identification-number for the at least one file, said file__system file-identification-number specifying field being for reconstructing a corresponding file_system file-identification-number field of the directory structure in the case where the directory structure is damaged, said file_system file-identification-number field being for assigning a system-wide unique identification-number to the at least one file;

(d.4) a comments-locations specifying field for specifying one or more comments-locations for the at least one file, said comments-locations specifying field being for reconstructing a corresponding comments-locations attribute field of the directory structure in the case where the directory structure is damaged, said comments-locations attribute field being for specifying locations of one or more comment files associated with the at least one file;

(d.5) a Put-away specifying field for specifying a return location for the at least one file, said Put-away specifying field being for reconstructing a corresponding Put-away attribute field of the directory structure in the case where the directory structure is damaged, said Put-away attribute field being for specifying a return location for the at least one file in case the file's graphical icon is displaced to a desktop area not having a storage directory assigned thereto; and (d.6) a Clump-size specifying field for specifying an incremental clump size for the at least one file, said Clump-size specifying field being for reconstructing a corresponding Clump-size attribute field of the directory structure in the case where the directory structure is damaged, said Clump-size attribute field being for defining an integral number of storage sub-areas by which the file is to grow or shrink when its stored data correspondingly grows or shrinks.

17. The tagging method of claim 7 wherein said random access storage device further has a directory structure for locating the pre-allocated storage sub-areas of each of said plural files and for defining a number of primitive storage regions used for forming each of the pre-allocated storage sub-areas and wherein said other file-recovery assisting information that is recorded includes:

(d.1) a primitives-per-storage sub-area specifying field for specifying said number of primitive storage regions used for forming each of the pre-allocated storage sub-areas.

18. The tagging method of claim 7 wherein:

said storage slack space has a variably positioned beginning and an opposed end;

said other file-recovery assisting information that is recorded includes one or more members in the core group consisting of:

(d.1) a length value field for indicating the total number of bits of valid information contained within the slack space;

(d.2) a length valid flag positioned at a predefined location within said slack space either adjacent to or spaced apart from said length value field, if the slack space can contain such a length value field in another location of the slack space, the length valid flag being for indicating whether the other location of the slack space does or does not contain valid length information;

(d.3) a fragmentation flag for indicating whether the corresponding file, within whose slack space the fragmentation flag resides, is fragmented or not; and (d.4) a tag-structure version number for defining a positioning format used for positioning other parts of the file-recovery assisting information within said slack space; and said step (c) of recording includes:

(c.1) recording the end-of-file tagging code at a position that is closer to the end of the slack space than any of the other file-recovery assisting information except for members of the core group, any one or more members of the core group being optionally positioned closer to the end of the slack space than is the end-of-file tagging code.

19. The tagging method of claim 1 wherein said steps of (a) locating, (b) determining, and (c) recording are performed for every file of said random access storage device that has sufficient slack space available for the end-of-file tagging code.

20. A tagging method for application to a random access storage device having plural pre-allocated storage sub-areas across which plural files are recorded, said random access storage device further having a directory structure for defining storage sub-areas allocated to each of said plural files and for optionally assigning one or more attributes to each such file, wherein the directory definition of each file may change over time as a consequence of file-modification requests made to an operating system, said method comprising the steps of:

(a) intercepting each file-modification request made to the operating system and for each given file that has been or is to be so-modified:

(b) locating a logically-last storage sub-area of the given file;

(c) determining if and how much storage slack space is available in the located logically-last storage sub-area;

(d) in response to said determination of the available slack space, recording an end-of-file tagging code in the slack space, if sufficient slack space is available for such an end-of-file tagging code.

21. The tagging method of claim 20 further comprising the step of:

(e) further recording other file-recovery assisting information in the slack space as the available slack space permits.

22. The tagging method of claim 21 wherein:

said storage slack space has a variably positioned beginning and an opposed end;

said file-recovery assisting information that is recorded in the slack space can include one or both of a core group and a non-core group, the core group including said end-of-file tagging code;

said steps (d) and (e) of recording include, in addition to recording the end-of-file tagging code, recording the remainder of the core group in the slack space, if sufficient slack space is available for such remainder of the core group;

said steps (d) and (e) of recording further include the additional step of determining whether, in addition to having sufficient slack space for storing the core group, there is sufficient slack space for storing at least part of the non-core group, and if so, recording the at least part of the non-core group for which there is sufficient slack space, the recorded non-core group being positioned farther away from the end of the slack space than is the core group.

23. The tagging method of claim 22 wherein said core group includes:

(d.1) a length value field for indicating the total number of bits of valid information contained within the slack space; and (d.2) a length valid flag positioned at a predefined location within said slack space either adjacent to or spaced apart from said length value field, if the slack space can contain such a length value field in another location of the slack space, the length valid flag being for indicating whether the other location of the slack space does or does not contain valid length information.

24. The tagging method of claim 23 wherein said core group further includes:

(d.3) a tag-structure version number for defining a positioning format used for positioning other parts of the file-recovery assisting information within said slack space.

25. A tagged data storage medium having:

(a) a plurality of files recorded across respective preallocated storage sub-areas of the recording medium; and (b) file tagging information recorded in available slack space of the allocated storage sub-areas of each said file.

26. A data storage medium according to claim 25 wherein the slack space of each file has a variably positioned beginning and an opposed end and wherein the file tagging information includes:

a unique end-of-file tagging code recorded within the slack space at a position that is displaced from the end of the slack space by a predefined displacement amount, said unique end-of-file tagging code being one that is not normally found recorded at said position of all slack spaces of a hypothetical like, but non-tagged, replica of the data storage medium.

27. A data storage medium according to claim 26 wherein:

the unique end-of-file tagging code is defined by a unique sequence of bits;

said unique sequence of bits does not include a consecutive sequence of eight bits each equal to logical zero; and said unique sequence of bits does not include a consecutive sequence of eight bits each equal to logical one.

28. The tagging method of claim 27 further wherein:

said unique sequence of bits does not include a consecutive sequence of eight bits defining a byte having the hexadecimal value, $D6_{hex}$.

29. A data storage medium according to claim 26 wherein said displacement amount is greater than zero bits.

30. A data storage medium according to claim 25 wherein the slack space of each file has a variably positioned beginning and an opposed end and wherein the file tagging information includes one or more members in the core group consisting of:

(b.1) a length value field for indicating the total number of bits of valid information contained within the slack space;

(b.2) a length valid flag positioned at a predefined location within said slack space either adjacent to or spaced apart from said length value field, if the slack space can contain such a length value field in another location of the slack space, the length valid flag being for indicating whether the other location of the slack space does or does not contain valid length information;

(b.3) a fragmentation flag for indicating whether the corresponding file, within whose slack space the fragmentation flag resides, is fragmented or not; and (b.4) a tag-structure version number for defining a positioning format used for positioning other parts of information recorded within said slack space.

31. A data storage medium according to claim 30 wherein the slack space further has a non-core group of information recorded within said slack space, the non-core group being positioned further away from end of the slack space than is the core group; and said non-core group includes one or more members in the group consisting of:

(b.5) an end-of-this-fork/fragment identifier for identifying the logical end of data of the respective fork or fragment using the storage sub-area in which said end-of-this-fork/fragment identifier resides;

(b.6) a further-extents-of-this-fork/fragment identifier for identifying the number of further forks or fragments if any that logically extend beyond the respective fork or fragment using the storage sub-area in which said further-extents-of-thisfork/fragment identifier resides; and (b.7) a number of for-this-fork/fragment extent-records, said number being equal to that identified by the further-extents-of-this-fork/fragment identifier, each for-this-fork/fragment extent-record including a for-this-fork/fragment extent-pointer pointing to the start of the corresponding fork or fragment that logically extends beyond the respective fork or fragment using the storage sub-area in which said for-this-fork/fragment extent-pointer resides.

32. A file recovery method for application to a random access storage device having files defined by data stored storage sub-areas of the device, some of said storage sub-areas having slack areas tagged by a predefined end-of-file tagging code, said file recovery method comprising the steps of:

(a) scanning the random access storage device to identify as tagged, each storage sub-area containing the end-of-file tagging code;

(b) in response to the identification of such tagged storage sub-areas, forming and storing file recovery information that indicates the ending locations of the identified storage sub-areas as respective, possible end positions or beginning positions of corresponding files or file fragments; and (c) reconstructing a directory structure in accordance with the formed file recovery information.

33. A file recovery method according to claim 32 wherein the slack space of each file or a fragment thereof has a variably positioned beginning and an opposed end and wherein said step (a) of scanning is characterized by:

(a.1) only identifying as tagged, each storage sub-area that contains the end-of-file tagging code positioned at a predefined displacement from the end of the corresponding storage sub-area containing that end-of-file tagging code.

34. A file recovery method according to claim 32 wherein the slack space of each file or a fragment thereof has a variably positioned beginning and an opposed end and wherein said step (a) of scanning is characterized by:

(a.1) only identifying as tagged, each storage sub-area that contains the end-of-file tagging code positioned within a predefined displacement distance measured from the end of the corresponding storage sub-area containing that end-of-file tagging code.

35. A file recovery method according to claim 32 wherein:

the slack space of each file or a fragment thereof has a variably positioned beginning and an opposed end;

depending on available storage room in each slack space, each given slack space may contain other filerecovery assisting information in addition to said end-of-file tagging code;

said file recovery method further comprises the steps of:

(d) in response to the identification of each such tagged storage sub-area, testing data neighboring the end-of-file tagging code for predefined validating code that indicates whether further portions of the slack space of the tagged storage sub-area contain a valid form of the other file-recovery assisting information and to what extent; and (e) if said predefined validating code is found, and to the extent that the validating code indicates that further portions of the slack space of the tagged storage sub-area contain a valid form of the other file-recovery assisting information, including said valid form of the other file-recovery assisting information in the file recovery information formed and stored in said step (b) of forming and storing file recovery information.

36. A file recovery method according to claim 35 wherein said validating code includes a predefined length valid flag positioned at a predefined location relative to the end of said slack space for indicating whether a neighboring subregion of the slack space does or does not contain valid length information.

37. A file recovery method according to claim 35 wherein said validating code includes a predefined tag-structure version number positioned at a predefined location relative to the end of said slack space for defining a format used in a remainder of the other file-recovery assisting information recorded in the slack space of the tagged storage sub-area.

38. A file recovery method according to claim 35 wherein said other file-recovery assisting information includes one or more items in the group consisting of:

(e.1) a tag-structure version number for defining a format used for a remainder of the other file-recovery assisting information;

(e.2) a fragmentation flag for indicating whether the corresponding file, within whose slack space the fragmentation flag resides, is fragmented or not; and (e.3) a length value field for indicating the total number of bits of valid information contained within the slack space.

39. A file recovery method according to claim 35 wherein said other file-recovery assisting information includes one or more items in the group consisting of:

(e.1) a file-size field for indicating the total file size of the corresponding current file, within whose slack space the file-size field resides;

(e.2) a number of fragments field for defining a total number of fragments used for forming the current file;

(e.3) a plurality of fragment pointers for respectively pointing to a respective plurality of file fragments forming the current file;

(e.4) a primary name of file field for specifying a primary name given to the current file; and (e.5) a last time of revision specifying field for specifying a time when the current file was last revised.

40. A data-recovery assisting apparatus for operatively coupling to a system processing unit of a computer system having a random access storage device with a damaged directory structure, where the random access storage device stores files whose respective file data is distributed across plural storage sub-areas of the random access storage device and where at least some of the sub-areas contain slack areas tagged by a predefined unique tagging code, said data-recovery assisting apparatus containing instructions for causing the system processing unit to carry out a recovery process including the steps of:

(a) scanning the random access storage device to identify as tagged, each storage sub-area containing the end-of-file tagging code;

(b) in response to the identification of such tagged storage sub-areas, forming and storing file recovery information that indicates the ending locations of the identified storage sub-areas as respective, possible end positions or beginning positions of corresponding files or file fragments; and (c) reconstructing a directory structure in accordance with the formed file recovery information.

41. A data-recovery assisting apparatus according to claim 40 wherein said apparatus includes a magnetically or optically encoded medium defining said instructions for said system processing unit.

42. A data-recovery assisting apparatus according to claim 40 wherein said random access storage device includes a magnetically or optically encoded and re-writable medium in which said respective file data of the files is stored.

43. A data storage medium according to claim 25 wherein the slack space of each file has a variably positioned beginning and an opposed end and wherein the file tagging information includes:

a unique end-of-file tagging code recorded within the slack space at a position that is displaced from the end of the slack space by a predefined displacement amount, said unique end-of-file tagging code being one that is not found with relatively great likelihood recorded at said position in randomly selected storage sub-areas of a hypothetical like, but non-tagged, replica of the data storage medium.

* * * * *